(12) United States Patent
Hasegawa et al.

(10) Patent No.: US 9,752,035 B2
(45) Date of Patent: *Sep. 5, 2017

(54) COMPOSITE LUBRICATING MATERIAL, ENGINE OIL, GREASE, AND LUBRICANT, AND METHOD OF PRODUCING A COMPOSITE LUBRICATING MATERIAL

(71) Applicant: GRAPHENE PLATFORM CORPORATION, Tokyo (JP)

(72) Inventors: Shoji Hasegawa, Tokyo (JP); Nagisa Kamiya, Tokyo (JP)

(73) Assignee: GRAPHENE PLATFORM CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/764,929

(22) PCT Filed: Mar. 23, 2015

(86) PCT No.: PCT/JP2015/058789
§ 371 (c)(1),
(2) Date: Jul. 30, 2015

(87) PCT Pub. No.: WO2016/002268
PCT Pub. Date: Jan. 7, 2016

(65) Prior Publication Data
US 2017/0175023 A1 Jun. 22, 2017

(30) Foreign Application Priority Data

Sep. 9, 2014 (WO) .................. PCT/JP2014/073838
Feb. 27, 2015 (WO) .................. PCT/JP2015/055977

(51) Int. Cl.
*C10M 103/02* (2006.01)
*C10M 113/02* (2006.01)
(Continued)

(52) U.S. Cl.
CPC ................ *C09C 1/46* (2013.01); *C01B 31/04* (2013.01); *C01B 31/0423* (2013.01);
(Continued)

(58) Field of Classification Search
CPC ...... C01B 31/02; C01B 31/0423; H01M 4/02; C10M 125/02; C10M 2203/022;
(Continued)

(56) References Cited

U.S. PATENT DOCUMENTS 9,023,308 B2   5/2015   Shankman .......... C01B 31/0453
2006/0216222 A1   9/2006   Jang .............................. 423/448
(Continued)

FOREIGN PATENT DOCUMENTS

GA          424607        2/1935
JP         2000348727    12/2000  ............. C10B 31/02
(Continued)

OTHER PUBLICATIONS

Official Action issued in corresponding U.S. Appl. No. 14/968,204 dated Mar. 29, 2016 (22 pgs).
(Continued)

*Primary Examiner* — Pamela H Weiss
(74) *Attorney, Agent, or Firm* — Hayes Soloway P.C.

(57) ABSTRACT

A composite lubricating material include at least a graphite-based carbon material and/or graphene-like graphite exfoliated from the graphite-based carbon material dispersed in a base material. The graphite-based carbon material is characterized by having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more: Rate (3R)=P3/(P3+P4)×100 . . . Equation 1, wherein, P3 is a peak intensity of a (101) plane of the rhombohedral graphite layer
(Continued)

(3R) based on the X-ray diffraction method, and P4 is a peak intensity of a (101) plane of the hexagonal graphite layer (2H) based on the X-ray diffraction method.

7 Claims, 30 Drawing Sheets

(51) Int. Cl.

| | | |
|---|---|---|
| C10M 125/02 | (2006.01) | |
| C09C 1/46 | (2006.01) | |
| C01B 31/04 | (2006.01) | |
| C09D 11/52 | (2014.01) | |
| C10M 169/04 | (2006.01) | |
| H01M 4/02 | (2006.01) | |
| C08K 3/04 | (2006.01) | |
| C08L 101/00 | (2006.01) | |
| H01M 4/587 | (2010.01) | |
| H01M 4/62 | (2006.01) | |
| C09D 11/037 | (2014.01) | |
| C04B 14/02 | (2006.01) | |
| C04B 28/14 | (2006.01) | |
| C04B 35/56 | (2006.01) | |
| C04B 35/63 | (2006.01) | |
| C04B 35/83 | (2006.01) | |
| C09C 3/04 | (2006.01) | |
| C09D 7/12 | (2006.01) | |
| C09D 11/03 | (2014.01) | |
| C09D 5/24 | (2006.01) | |
| H01M 4/36 | (2006.01) | |
| H01M 10/0525 | (2010.01) | |
| H01M 10/052 | (2010.01) | |

(52) U.S. Cl.
CPC ........ *C01B 31/0469* (2013.01); *C04B 14/024* (2013.01); *C04B 28/14* (2013.01); *C04B 35/5611* (2013.01); *C04B 35/6303* (2013.01); *C04B 35/83* (2013.01); *C08K 3/04* (2013.01); *C08L 101/00* (2013.01); *C09C 3/04* (2013.01); *C09D 5/24* (2013.01); *C09D 7/1216* (2013.01); *C09D 11/03* (2013.01); *C09D 11/037* (2013.01); *C09D 11/52* (2013.01); *C10M 125/02* (2013.01); *C10M 169/04* (2013.01); *H01M 4/02* (2013.01); *H01M 4/366* (2013.01); *H01M 4/587* (2013.01); *H01M 4/625* (2013.01); *H01M 10/0525* (2013.01); *C01P 2002/72* (2013.01); *C01P 2002/74* (2013.01); *C01P 2002/77* (2013.01); *C01P 2004/54* (2013.01); *C01P 2004/61* (2013.01); *C04B 2235/425* (2013.01); *C10M 2201/041* (2013.01); *C10M 2203/003* (2013.01); *C10M 2203/022* (2013.01); *C10M 2207/401* (2013.01); *C10N 2230/10* (2013.01); *C10N 2240/10* (2013.01); *C10N 2250/10* (2013.01); *H01M 10/052* (2013.01)

(58) Field of Classification Search
CPC ...... C10M 2203/003; C10M 2207/401; C10M 2201/041; C10M 103/02; C10M 113/02; C10M 2201/0413; C10N 2240/10; C10N 2230/10; C10N 2250/10; C01P 2002/74
See application file for complete search history.

(56) References Cited

U.S. PATENT DOCUMENTS

| | | | |
|---|---|---|---|
| 2010/0055464 A1 | 3/2010 | Sung | 428/408 |
| 2010/0147188 A1* | 6/2010 | Mamak | B82Y 30/00 106/31.13 |
| 2011/0046027 A1 | 2/2011 | Zhamu et al. | 508/113 |
| 2011/0143093 A1* | 6/2011 | Kusunoki | B82Y 30/00 428/141 |
| 2011/0257054 A1* | 10/2011 | Baran, Jr. | C10M 139/04 508/139 |
| 2012/0077035 A1* | 3/2012 | Spahr | C01B 31/04 428/402 |
| 2013/0022530 A1* | 1/2013 | Mercuri | B82Y 40/00 423/447.1 |
| 2013/0102084 A1* | 4/2013 | Loh | B01J 21/185 436/94 |
| 2013/0178402 A1* | 7/2013 | Chauveau | C10M 125/02 508/131 |
| 2014/0005083 A1 | 1/2014 | Malshe | 508/102 |
| 2014/0023864 A1 | 1/2014 | Sumant et al. | 428/408 |
| 2014/0342955 A1 | 11/2014 | Wu et al. | 508/122 |
| 2014/0378599 A1 | 12/2014 | Sawa et al. | 524/496 |

FOREIGN PATENT DOCUMENTS

| | | | | |
|---|---|---|---|---|
| JP | 2007277500 | 10/2007 | .......... | C10M 177/00 |
| JP | 2008298097 | 12/2008 | .......... | C10M 103/02 |
| JP | 2013536141 | 9/2013 | .......... | C10B 31/02 |
| JP | 2013203905 | 10/2013 | .......... | C10B 31/04 |
| JP | 2013538914 | 10/2013 | .......... | C10M 107/02 |
| JP | 2013233790 | 11/2013 | .......... | B29B 7/90 |
| JP | 2014514231 | 6/2014 | .......... | C10B 31/02 |
| WO | WO2011162727 | 12/2011 | .......... | C10B 31/04 |
| WO | WO2012125854 | 9/2012 | .......... | C10B 31/02 |
| WO | WO2014064432 | 5/2014 | .......... | C09D 11/02 |
| WO | WO2014087992 | 6/2014 | .......... | C10B 31/02 |

OTHER PUBLICATIONS

EIC Search conducted Mar. 23, 2016 in U.S. Appl. No. 14/968,204 (67 pgs).
Wilhelm et al., "Proportion and Dispersion of Rhombohedral Sequences in the Hexagonal Structure of Graphite Powders" Carbon 45 (2007) 2356-2364 (9 pgs).
Taylor & Francis Group, LLC and NanoScience Portal Present "Structure and Symmetry of Graphite" by Constantinos D. Zeinalipour-Yazd.i (14 pgs).
Catalog, Carbon Products for Mechanical Applications, Toyo Tanso Co., Ltd., Sep. 12, 2013, pp. 30-39 (10 pgs).
Inagaki et al., "Structural Change of Graphite with Grinding," Feb. 1, 1973, No. 74, pp. 76-82 (7 pgs).
Japanese Decision to a Grant Patent issued in application No. 2015-516132, dated Jun. 25, 2015 (6 pgs).
Japanese Office Action issued in application No. 2015-516132, dated May 11, 2015 (4 pgs).
Kawasaki, S. Classification of solid carbon materials and their structural characteristics, Nagoya Institute of Technology, undated, (49 pgs).
Kinoshita et al., "Tribological properties of monolayer graphene oxide sheets as water-based lubricant additives," Carbon, vol. 66, Jan. 2014, pp. 720-723, abstract only (2 pgs).
Noda et al., "Changes of Probabilities $P_1$, $P_{ABA}$, $P_{ABC}$ with Heat Treatment of Carbons," Sep. 16, 1966, No. 47, pp. 14-23 (10 pgs).
Parthasarathy et al., "Spectroscopic and X-ray diffraction studies on fluid deposited rhombohedral graphite from the Eastern Ghats Mobile Belt, India," Current Science, vol. 90, No. 7, Apr. 10, 2006, pp. 995-1000 (6 pgs).
International Preliminary Report on Patentability issued in application No. PCT/JP2015/058789, dated Mar. 23, 2017 (7 pgs).

* cited by examiner

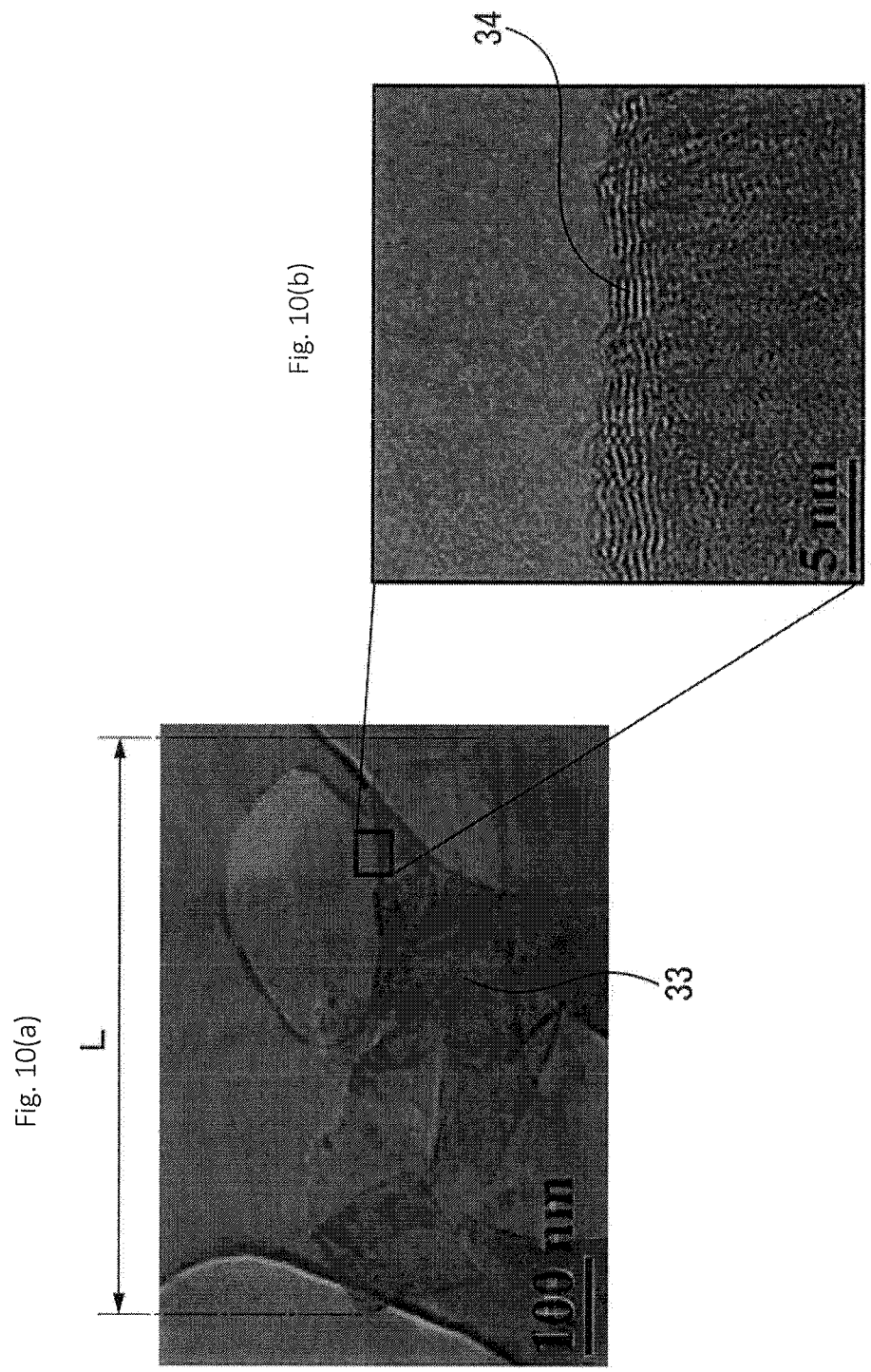

Fig. 13
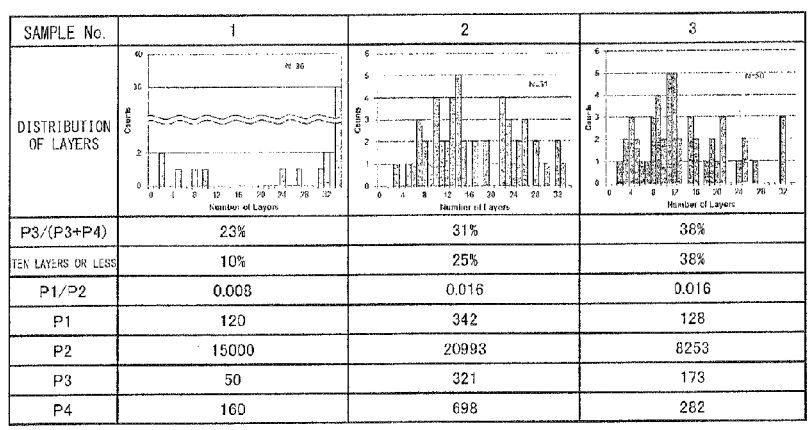
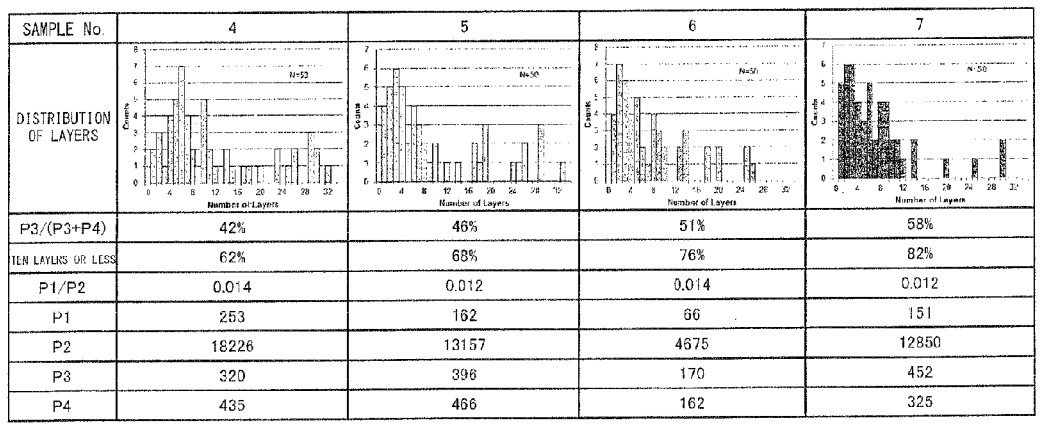

P3/(P3+P4)=28%
TEN LAYERS OR LESS: 25%

P3/(P3+P4)=31%
TEN LAYERS OR LESS: 25%

COMPOSITE LUBRICATING MATERIAL, ENGINE OIL, GREASE, AND LUBRICANT, AND METHOD OF PRODUCING A COMPOSITE LUBRICATING MATERIAL

TECHNICAL FIELD

The present invention relates to a composite lubricating material, engine oil, grease, and lubricant, and method of producing a composite lubricating material.

BACKGROUND ART

In recent years, addition of various nanomaterials to a driving mechanism, such as an engine, and a transmission mechanism, such as a transmission gear and a reduction gear, has been studied for purposes of improving fuel consumption, reducing friction, and the like. In particular, for environmental or resource problems, carbon materials such as graphene, CNT (carbon nanotube) and fullerene have attracted attention as nonmetal nanomaterials.

Taking engine oil as an example, addition of molybdenum disulfide ($MoS_2$) or flaky graphite having a layered crystal structure, which exhibit low shearing resistance, and the like has been known (Non Patent Literature 5). Further, a sliding member in which a friction loss is further reduced on a sliding surface by using graphite in a particulate form has been studied (Patent Literature 1).

On the other hand, as for lubricants, for a purpose of prolonging the life of a lubricant by suppressing deterioration of the base oil itself caused by a temperature change, oxidation, and the like, addition of carbon materials, such as carbon fibers and carbon nanotubes, having an antioxidative effect and a decomposition/deterioration preventive effect for base oil, and radioactive substances generating a negative ion and the like has been studied (Patent Literatures 2, 3 and 4).

CITATION LIST

Patent Literature

PTL 1: JP-A-2013-203905 ([0091] and [0120])
PTL 2: JP-A-2008-298097 ([0015])
PTL 3: JP-T-2013-538914 ([0074] and [0090])
PTL 4: JP-A-2007-277500 ([0002]-[0003])
PTL 5: WO 2014/064432 ([0040])

Non Patent Literature

NPL 1: Structural Change of Graphite with Griding; authors: Michio INAGAKI, Hisae MUGISHIMA, and Kenji HOSOKAWA; Feb. 1, 1973 (Received)
NPL 2: Changes of Probabilities P1, PABA, PABC with Heat Treatment of Carbons; authors: Tokiti NODA, Masaaki IWATSUKI, and Michio INAGAKI; Sep. 16, 1966 (Received)
NPL 3: Spectroscopic and X-ray diffraction studies on fluid deposited rhombohedral graphite from the Eastern Ghats Mobile Belt, India; G. Parthasarathy, Current Science, Vol. 90, No. 7, 10 Apr. 2006
NPL 4: Classification of solid carbon materials and their structural characteristics; Nagoya Institute of Technology; Shinji KAWASAKI
NPL 5: Catalog "Carbon Products for Mechanical Applications, Toyo Tanso Co., Ltd." (Date of issue: Sep. 12, 2013)
NPL 6: Tribological properties of monolayer graphene oxide sheets as water-based lubricant additives; H. Kinoshita, Y. Nishina, A. A. Alias, M. Fujii; Carbon, Volume 66, January 2014, Pages 720-723

SUMMARY OF INVENTION

Technical Problem

However, there is a problem in the methods disclosed in Patent Literature 1, namely, a sliding part is directly coated with graphite, thus making reapplication of the graphite difficult. Further, the methods disclosed in Patent Literatures 2 and 3 show that carbon fibers and carbon nanotubes are dispersed in base oil, and that performing this dispersion is effective in improving sliding performance, preventing oxidation, and suppressing changes in viscosity caused by temperature changes. However these effects are not significant. The methods disclosed in Patent Literature 4 are intended to prevent oxidation and decomposition/deterioration of lubricant by adding tourmaline powders, however it is not clear if this contributes to improving lubricity.

Further, regarding lubricity, from experiments performed by using oxidized graphene, it is shown that a lubricating agent comprising an aqueous dispersion of graphene has better lubricity than a conventional lubricating agent (Non Patent Literature 6). Thus utilizing graphene in a lubricating agent is considered.

However, there has been a problem that an amount of the graphene that is exfoliated is normally small by processing natural graphite without any treatments. However, as a result of earnest studies, by carrying out predetermined treatments to graphite serving as a source material, there was obtained a graphite-based carbon material (a graphene precursor), from which graphene was easily exfoliated, the graphene being able to be dispersed at a high concentration or to a high degree. A part or whole of the graphene precursor is exfoliated by ultrasonic waves, stirring and sliding to produce a mixed material being "graphene-like graphite", containing material from the graphene precursor to graphene. A size, thickness, etc. of the graphene-like graphite are not limited since they are variable depending on an addition amount, a process time, etc. of the graphene precursor, however, it is preferred that the graphene-like graphite is more flaked. That is, in other words, the graphite-based carbon material (the graphene precursor) is graphite capable of being easily exfoliated and dispersed as graphene-like graphite by sliding using a driving unit, such as an engine, a transmission gear, and a reduction gear.

It was found that lubricity could be improved by dispersing a small amount of the graphene precursors and/or the graphene-like graphite in a base material. Moreover, it was found that the composite lubricating material could be produced without using a specific production method. Regarding lubricity, for example, reduction of a friction coefficient, reduction of frictional resistance, radiation of sliding heat, prevention of oxidation and decomposition/deterioration of base oil, and the like can be improved, and as a result, this contributes to, for example, improving fuel consumption and the like.

The invention has been completed focusing on such problems, and an object of the invention is to provide a composite lubricating material, engine oil, grease, and lubricant and method of producing a composite lubricating material, excellent in lubricity.

Another object of the invention is to provide a composite lubricating material capable of exhibiting desired characteristics even though an amount of the graphene-like graphite dispersed/added in a base material is small.

Yet another object of the invention is to provide a composite lubricating material excellent in lubricity by utilizing a conventional production process.

Solution to Problem

In order to solve the above-described problems, a composite lubricating material of the present invention comprises at least a graphite based carbon material and/or graphene-like graphite exfoliated from the graphite-based carbon material dispersed in a base material, the graphite-based carbon material characterized by having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$\text{Rate}(3R)=P3/(P3+P4)\times 100 \quad \text{Equation 1}$$

wherein

P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method.

According to the features, the composite material is excellent in lubricity. This is because, it is speculated that, at least one of a graphite based carbon material and graphene-like graphite is dispersed in a base material, and as sliding is performed by a sliding part, the graphite based carbon material or the graphene-like graphite is further flaked, thereby increasing an absolute number of pieces of the graphene-like graphite. As a result, a density of the graphene-like graphite is increased over time and lubricity is improved.

It is noted that, in this specification, "a graphite-based carbon material and/or graphene-like graphite exfoliated from the graphite-based carbon material (are) dispersed" means that at least any one of a graphite-based carbon material and graphene-like graphite exfoliated from the graphite-based carbon material is dispersed.

A weight ratio of the graphite-based carbon material to the base material is characterized by being 1/10,000 or more to less than 1.

According to the feature, a lubrication function of added products can be sufficiently exerted.

The base material is characterized by being at least one or more of base oil derived from mineral, synthesis, plants or animals.

According to the feature, a composite lubricating material excellent in lubricity can be obtained.

The composite lubricating material is characterized by comprising at least one or more kinds of additives for a purpose of preventing oxidative deterioration.

According to the feature, the composite lubricating material is not only excellent in lubricity, but also can fully exert a lubrication function for a long time.

The additives are characterized by comprising a radioactive substance.

According to the feature, a negative ion generated by the radioactive substance suppresses active oxygen that causes oxidation and decomposition of base oil, thus the life of a composite lubricating material can be further prolonged.

Engine oil is characterized by comprising the composite lubricating material.

According to the feature, engine oil excellent in lubricity used for an internal combustion engine or the like can be obtained.

Grease is characterized by comprising the composite lubricating material.

According to the feature, grease excellent in lubricity used for a sliding member such as a rolling bearing can be obtained.

Lubricant is characterized by comprising the composite lubricating material.

According to the feature, lubricant used for an operating part such as a fluid bearing can be obtained.

BRIEF DESCRIPTION OF DRAWINGS

FIGS. 10(a) and (b) are TEM images of a graphite-based carbon material (graphene) dispersed in a dispersion.

FIG. 13 is a diagram which shows distributions of the number of layers of graphite-based carbon materials each dispersed in dispersions that were produced using Samples 1 to 7 as precursors.

DESCRIPTION OF EMBODIMENTS

Figure 1:
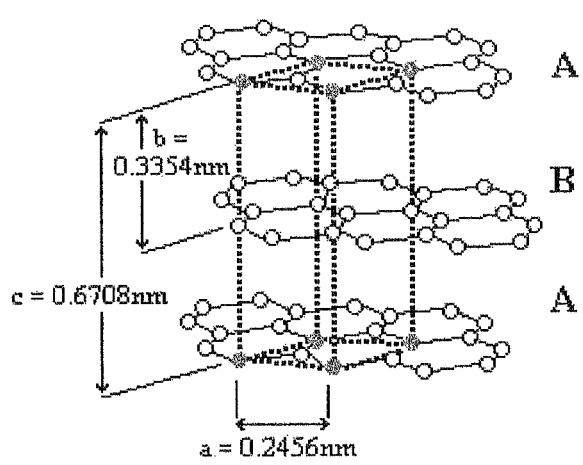
FIG. 1 is a figure which shows a crystal structure of graphite, where (a) refers to a crystal structure of hexagonal crystals, and (b) refers to a crystal structure of rhombohedral crystals.
Figure 1B:
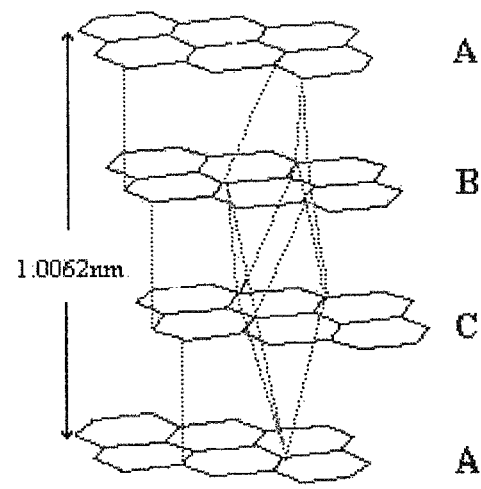

The invention focuses on a crystal structure of graphite, and, at first, matters relating to the crystal structure will be explained. It has been known that natural graphite is classified into three types of crystal structures, namely hexagonal crystals, rhombohedral crystals and disordered crystals, depending on an overlapping manner of layers. As shown in FIG. 1, hexagonal crystals have a crystal structure in which layers are arranged in the order of ABABAB . . . , while rhombohedral crystals have a crystal structure in which layers are arranged in the order of ABCABCABC . . . .

In natural graphite, there are almost no rhombohedral crystals in a stage where natural graphite is excavated. However, about 14% of rhombohedral crystals exist in general natural graphite-based carbon materials because pulverization or the like is carried out in a purification stage. In addition, it has been known that a proportion of rhombohedral crystals converges on about 30% even when pulverization is carried out during purification for a long time (Non-Patent Literatures 1 and 2).

Moreover, a method in which graphite is expanded by heating, rather than with physical forces such as pulverization, thereby flaking the graphite. However, even when graphite is treated with a heat of 1600 K (about 1,300° C.), a proportion of rhombohedral crystals is about 25% (Non-Patent Literature 3). Furthermore, the proportion is up to about 30% even when heat of an extremely high temperature of 3000° C. is applied thereto (Non-Patent Literature 2).

Thus, although it is possible to increase a proportion of rhombohedral crystals by treating natural graphite with physical forces or heat, the upper limit is about 30%.

Hexagonal crystals (2H), which are included in natural graphite at a high level, are very stable, and an interlayer van der Waals' force between their graphene layers is shown by Equation 3 (Patent Literature 5). By applying an energy exceeding this force, graphene is exfoliated. An energy required for the exfoliation is inversely proportional to the cube of the thickness. Therefore, in a thick state where numerous layers are overlapped, graphene is exfoliated by a weak physical force such as by very feeble ultrasonic waves. However, in a case where graphene is exfoliated from somewhat thin graphite, a very large energy is required. In other words, even if graphite is treated for a long time, only weak parts of the surface are exfoliated, and large parts remain not exfoliated.

$$Fvdw = H \cdot A / (6\pi \cdot t^3) \qquad \text{Equation 3}$$

Fvdw: Van der Waals' force
H: Hamaker constant
A: Surface area of graphite or graphene
t: Thickness of graphite or graphene The present inventors succeeded in increasing a proportion of rhombohedral crystals (3R), which had been increased to only about 30% by treatments of pulverization or heating to an extremely high temperature, to 30% or more by carrying out predetermined treatments, as shown below, to natural graphite. The following findings were obtained as results of experiments and studies. That is, when a content of rhombohedral crystals (3R) in a graphite-based carbon material is higher, particularly when the content is 31% or more, there is a tendency that graphene is easily exfoliated by use of such a graphite-based carbon material as a precursor, thereby easily obtaining a highly concentrated and dispersed graphene dispersion or the like. For the reason, it is considered that, when a shear force or the like is applied to rhombohedral crystals (3R), a deformation occurs between layers, i.e. a deformation in the entire structure of the graphite becomes large, and graphene is easily exfoliated independently of the van der Waals' force. Accordingly, in the invention, a graphite-based carbon material, from which graphene is easily exfoliated by carrying out predetermined treatments to natural graphite, and which makes it possible to disperse graphene at a high concentration or to a high degree, is called a graphene precursor. Hereinafter, a method of producing a graphene precursor showing predetermined treatments, a crystal structure of the graphene precursor, and a graphene dispersion using the graphene precursor will be described in that order in examples below.

Here, in the specification, a graphene refers to a flake-like or sheet-like graphene which is a crystal of a mean size of 100 nm or more but which is not a fine crystal of a mean size of several nanometers to tens of nanometers, and which has 10 layers or less.

Additionally, since graphene is a crystal with a mean size of 100 nm or more, when artificial graphite and carbon black, which are amorphous (microcrystal) carbon materials other than natural graphite, are even treated, graphene cannot be obtained (Non-Patent Literature 4).

Further, in the specification, a graphene composite means a composite which is produced by using the graphite-based carbon material useful as a graphene precursor according to the invention, i.e. a graphite-based carbon material having a Rate (3R) of 31% or more (e.g. Samples 2-7 of Example 1, samples 2, 21, . . . of Example 5 described below).

Hereinafter, examples for carrying out the composite lubricating material, the engine oil, the grease, and the lubricant, according to the present invention, will be described.

Example 1

<As to Production of a Graphite-Based Carbon Material Useful as a Graphene Precursor>

A method for obtaining a graphite-based carbon material useful as a graphene precursor by a production apparatus A using a jet mill and plasma shown in FIG. 3 will be explained. As an example, the production apparatus A refers to a case in which plasma is applied for the radiowave-force-based treatment and in which the jet mill is used for the physical-force-based treatment.

Figure 3:
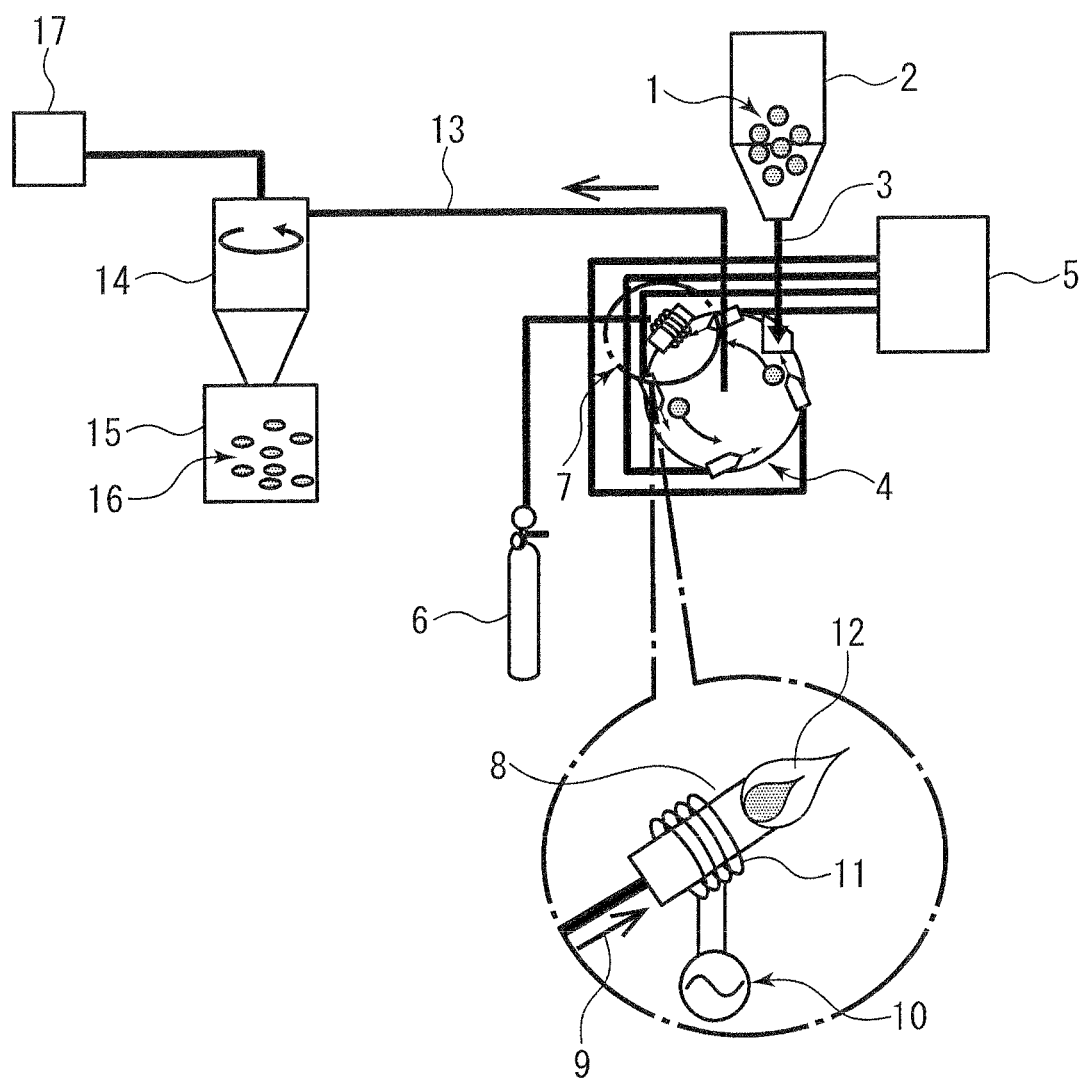
FIG. 3 is a diagram which illustrates a production apparatus A using a jet mill and plasma of Example 1.

In FIG. 3, the symbol 1 refers to a particle of 5 mm or less of a natural graphite material (flaky graphite ACB-50 manufactured by Nippon Graphite Industries, ltd.); the symbol 2 refers to a hopper which stores the natural graphite material 1; the symbol 3 refers to a Venturi nozzle which discharges the natural graphite material 1 from the hopper 2; the symbol 4 refers to a jet mill which jets the air which has been pumped from a compressor 5, while being divided into eight places, to thereby allow the natural graphite material to collide against the inside of a chamber by a jet blast; and the symbol 7 refers to a plasma generator which sprays a gas 9, such as oxygen, argon, nitrogen or hydrogen, through a nozzle 8 from a tank 6 and which applies a voltage to a coil 11, wound around the outer periphery of the nozzle 8, from a high-voltage power supply 10, thereby generating plasma inside the chamber of the jet mill 4, and the plasma generator is provided in each of four places inside the chamber. The symbol 13 refers to a pipe which connects the jet mill 4 and a dust collector 14 to one another; the symbol 14 refers to a dust collector; the symbol 15 refers to a collection container; the symbol 16 refers to a graphite-based carbon material (graphene precursor); and the symbol 17 refers to a blower.

Next, the production method will be explained. Conditions for the jet mill and plasma are as follows.

The conditions for the jet mill are as follows.
Pressure: 0.5 MPa
Air volume: 2.8 m$^3$/min
Nozzle inner Diameter: 12 mm
Flow rate: about 410 m/s
The conditions for plasma are as follows.
Output: 15 W
Voltage: 8 kV
Gas species: Ar (purity 99.999 vol %)
Gas flow rate: 5 L/min It is considered that the natural graphite materials 1, which have been charged into the chamber of the jet mill 4 from the Venturi nozzle 3, are accelerated to the sonic velocity or higher inside the chamber, and are pulverized by impact between the natural graphite materials 1 or by impact of them against the wall, and that, simultaneously, the plasma 12 discharges an electric current or excites the natural graphite materials 1, acts directly on atoms (electrons), and increases deformations of crystals, thereby promoting the pulverization. When the natural graphite materials 1 turn into fine particles of a certain particle diameter (about 1 to 10 μm), their mass is reduced, the centrifugal force is weakened, and, consequently, the natural graphite materials 1 are pumped out from the pipe 13 which is connected to the center of the chamber.

A gas including graphite-based carbon materials (graphene precursors), which have been flowed from the pipe 13 into a cylindrical container of the chamber of the dust collector 14, forms a spiral flow, and drops the graphite-based carbon materials 16, which collide with the internal wall of the container, to a collection container 15 below, while an ascending air current generates in the center of the chamber due to a tapered container part of the downside of the chamber, and the gas is emitted from the blower 17 (so-called cyclone effects). According to the production apparatus A in this example, about 800 g of a graphene precursor from 1 kg of the raw materials, i.e. natural graphite materials 1, is used. The graphite-based carbon material (graphene precursors) 16 was obtained (recovery efficiency: about 800).

Next, based on the production apparatus B using a ball mill and microwaves shown in FIG. 4, a method for obtaining a graphite-based carbon material useful as a graphene precursor will be described. The apparatus B refers to, as an example, a case where microwaves are applied as the radiowave-force-based treatment and where a ball mill is used for the physical-force-based treatment.

Figure 4A:
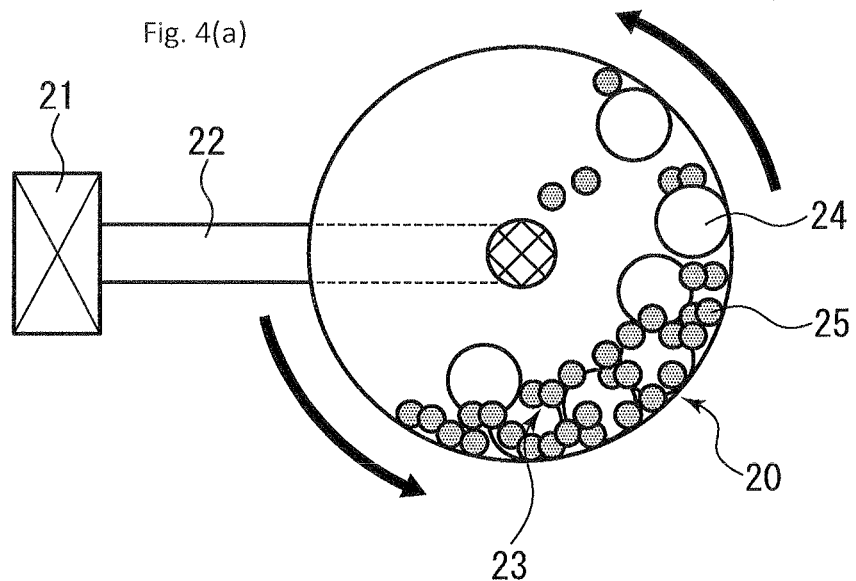
FIG. 4 is a figure which illustrates a production apparatus B using a ball mill and magnetron of Example 1, where (a) is a diagram which illustrates a pulverizing state, and (b) is a diagram which illustrates a state where graphite-based carbon materials (precursors) are collected.
Figure 4B:
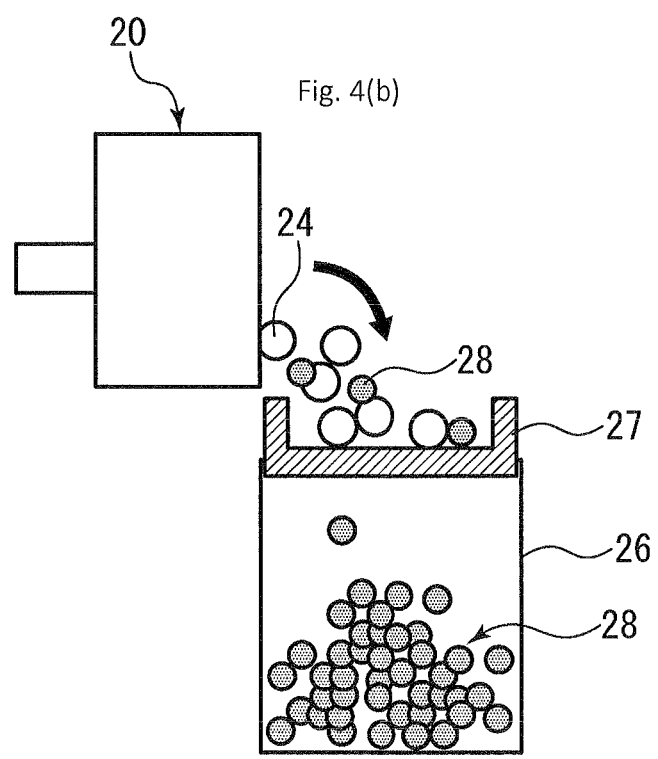

In FIGS. 4($a$) and ($b$), the symbol 20 refers to the ball mill; the symbol 21 refers to a microwave generator (magnetron); the symbol 22 refers to a wave guide; the symbol 23 refers to a microwave inlet; the symbol 24 refers to a media; the symbol 25 refers to particles of 5 mm or less of a natural graphite material (flaky graphite ACB-50 manufactured by Nippon Graphite Industries, ltd.); the symbol 26 refers to a collection container; the symbol 27 refers to a filter; and the symbol 28 refers to graphite-based carbon material (graphene precursors).

Next, the production method will be explained. Conditions for the ball mill and the microwave generator are as follows.

The conditions for the ball mill are as follows.
Rotational speed: 30 rpm
Media size: ϕ5 mm
Media species: zirconia balls
Pulverization time: 3 hours
The conditions for the microwave generator (magnetron) are as follows.
Output: 300 W
Frequency: 2.45 GHz
Irradiation method: Intermittent 1 kg of natural graphite carbon raw materials 25 and 800 g of media 24 are charged into the chamber of the ball mill 20, the chamber is closed, and the mixture is treated at a rotational speed of 30 rpm for 3 hours. During the treatment, microwaves are irradiated intermittently (for 20 seconds every 10 minutes) to the chamber. It is considered that the microwave irradiation acts directly on atoms (electrons) of the raw materials, thus increasing deformations of the crystals. After the treatment, media 24 are removed by the filter 27, and thus, powder of about 10 μm of graphite-based carbon materials (precursors) 28 can be collected in the collection container 26.

<As to an X-Ray Diffraction Profile of Graphite-Based Carbon Materials (Graphene Precursors)>

Figure 5:
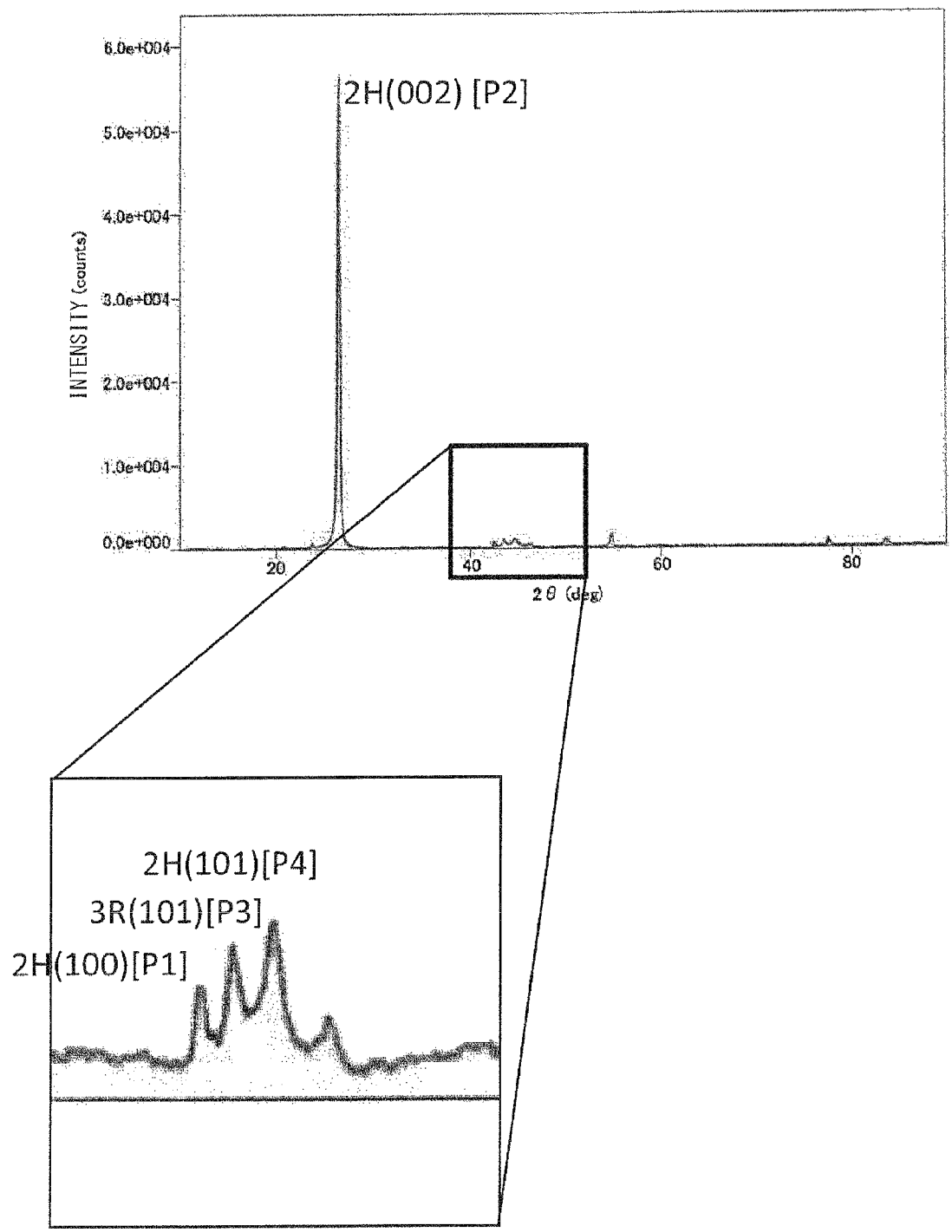
FIG. 5 is a diagram which shows an X-ray diffraction profile of a graphite-based carbon material of Sample 5 produced by the production apparatus B according to Example 1.
Figure 6:
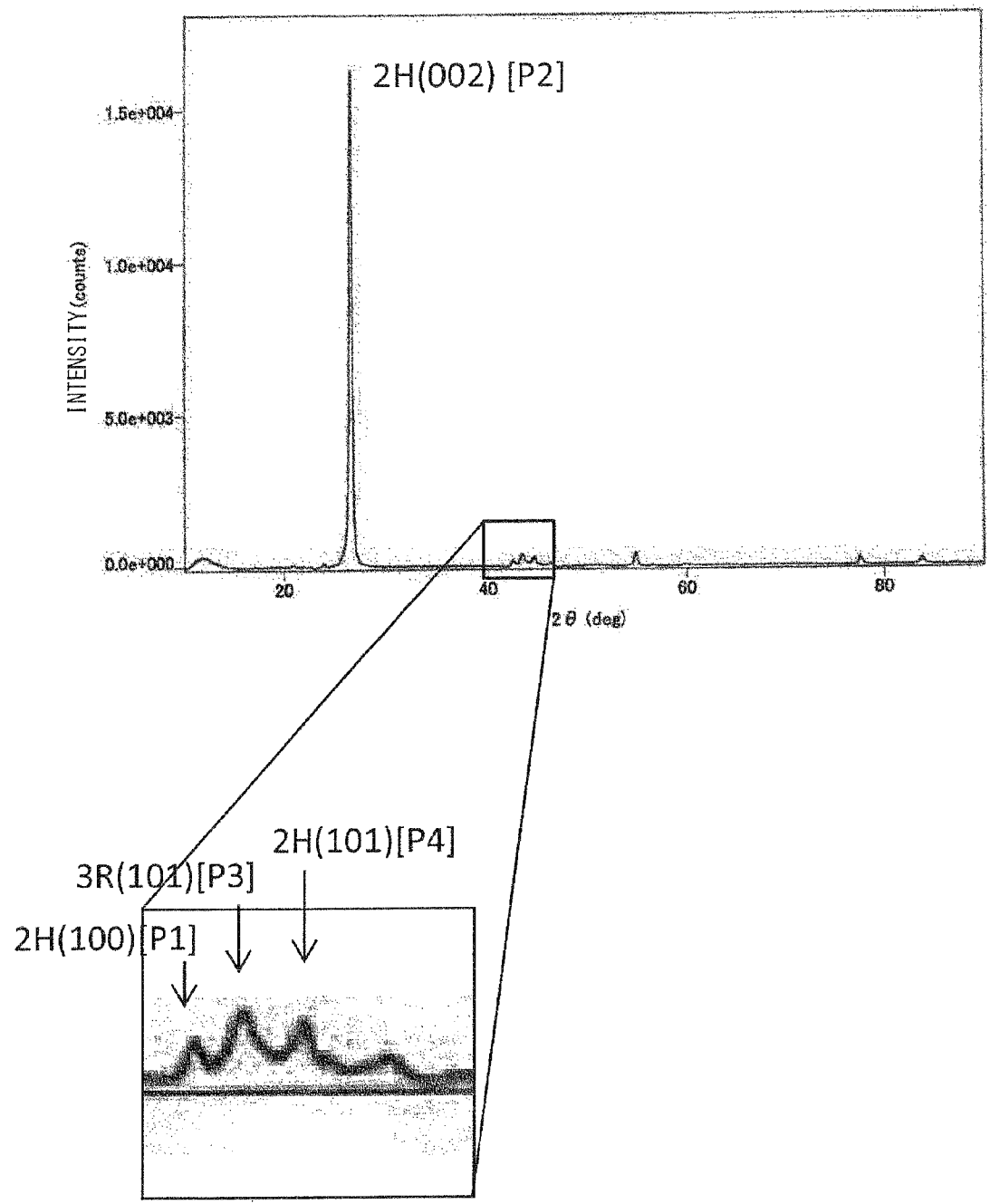
FIG. 6 is a diagram which shows an X-ray diffraction profile of a graphite-based carbon material of Sample 6 produced by the production apparatus A according to Example 1.
Figure 7:
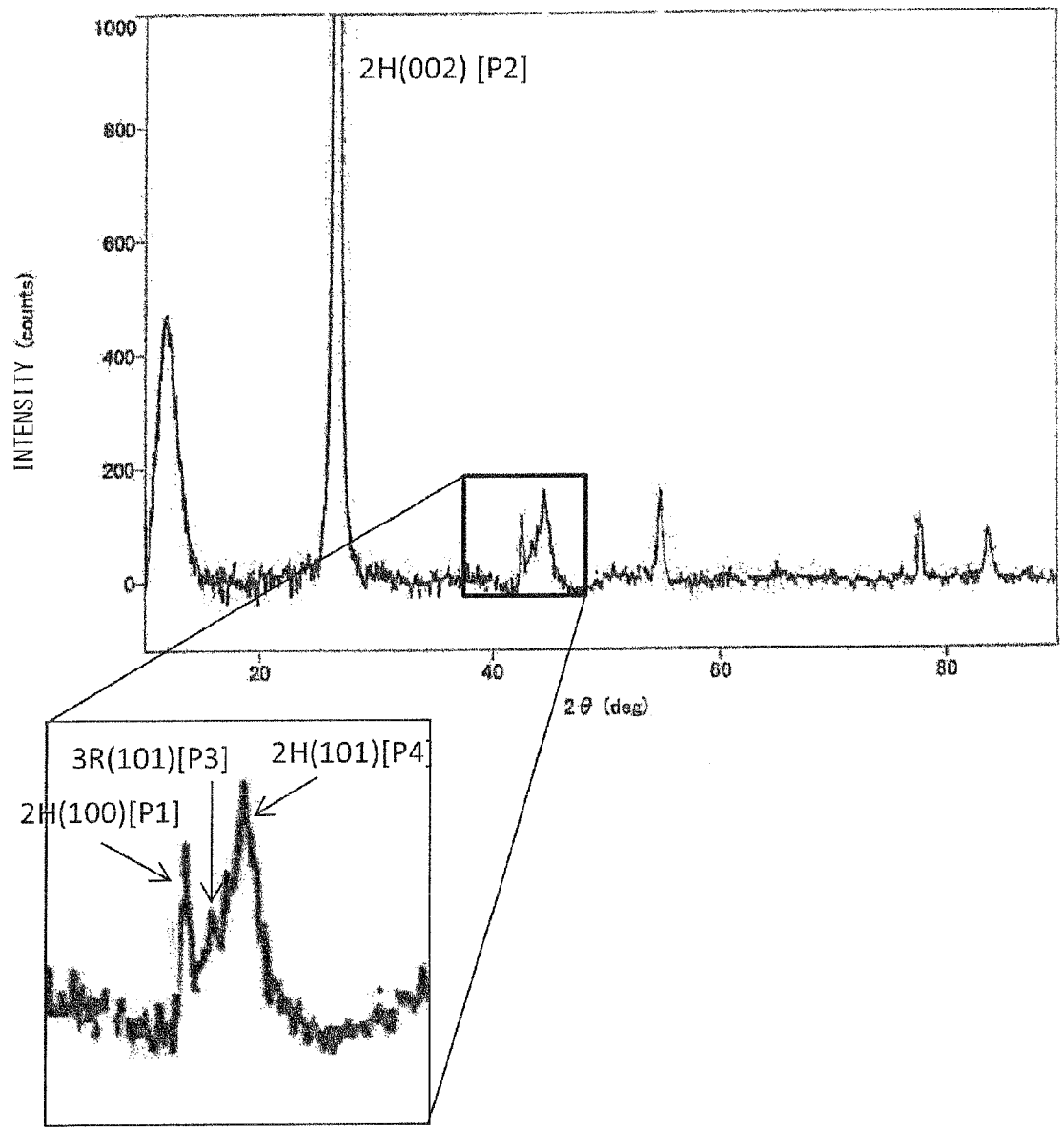
FIG. 7 is a diagram which shows an X-ray diffraction profile of a graphite-based carbon material of Sample 1 indicating a comparative example.

With reference to FIGS. 5 to 7, X-ray diffraction profiles and crystal structures will be described with respect to graphite-based natural materials (Samples 6 and 5) produced by the production apparatuses A and B, and the powder of about 10 μm of graphite-based natural materials (Sample 1: a comparative example) obtained by using only the ball mill of the production apparatus B.

The measurement conditions for the X-ray diffraction apparatus are as follows.

Source: Cu Kα ray
Scanning speed: 20°/min
Tube voltage: 40 kV
Tube current: 30 mA According to the X-ray diffraction method (horizontal-sample-mounting-model multi-purpose X-ray diffractometer Ultima IV manufactured by Rigaku Corporation), each sample shows peak intensities P1, P2, P3 and P4 in the planes (100), (002) and (101) of hexagonal crystals 2H and in the plane (101) of rhombohedral crystals 3R. Therefore, these peak intensities will be explained.

Here, the measurements of X-ray diffraction profile have been used the so-called standardized values at home and abroad in recent years. This horizontal-sample-mounting-model multi-purpose X-ray diffractometer Ultima IV manufactured by Rigaku Corporation is an apparatus which can measure X-ray diffraction profile in accordance with JIS R 7651:2007 "Measurement of lattice parameters and crystallite sizes of carbon materials". In addition, Rate (3R) is the ratio of the diffraction intensity obtained by the Rate (3R) =P3/(P3+P4)×100, even if the value of the diffraction intensity is changed, the value of Rate (3R) is not changes. Means that the ratio of the diffraction intensity is standardized, it is commonly used to avoid performing the identification of the absolute value substance and its value does not depend on measurement devices.

As shown in FIG. 5 and Table 1, Sample 5 produced by the production apparatus B, which applies a treatment with a ball mill and a microwave treatment, had high rates of peak intensities P3 and P1, and a Rate (3R) defined by Equation 1 showing a rate of P3 to a sum of P3 and P4 was 46%. Additionally, the intensity ratio P1/P2 was 0.012.

$$\text{Rate}(3R) = P3/(P3+P4) \times 100 \quad \text{Equation 1}$$

wherein

P1 is a peak intensity of a (100) plane of the hexagonal graphite layer (2H) based on the X-ray diffraction method, P2 is a peak intensity of a (002) plane of the hexagonal graphite layer (2H) based on the X-ray diffraction method, P3 is a peak intensity of a (101) plane of the rhombohedral graphite layer (3R) based on the X-ray diffraction method, and P4 is a peak intensity of a (101) plane of the hexagonal graphite layer (2H) based on the X-ray diffraction method.

TABLE 1

|  | Peak intensities [counts · deg] (2θ[°]) |
|---|---|
| Hexagonal crystals 2H (100) [P1] | 162 (42.33) |
| Hexagonal crystals 2H (002) [P2] | 13157 (26.50) |
| Rhombohedral crystals 3R (101) [P3] | 396 (43.34) |

TABLE 1-continued

|  | Peak intensities [counts · deg] (2θ[°]) |
|---|---|
| Hexagonal crystals 2H (101) [P4] | 466 (44.57) |

In the same manner, as shown in FIG. 6 and Table 2, Sample 6 produced by the production apparatus A, which applies a treatment based on the jet mill and a treatment based on plasma, had high rates of peak intensities P3 and P1, and the Rate (3R) was 51%. In addition, the intensity ratio P1/P2 was 0.014.

TABLE 2

|  | Peak intensities [counts · deg] (2θ[°]) |
|---|---|
| Hexagonal crystals 2H (100) [P1] | 66 (42.43) |
| Hexagonal crystals 2H (002) [P2] | 4,675 (26.49) |
| Rhombohedral crystals 3R (101) [P3] | 170 (43.37) |
| Hexagonal crystals 2H (101) [P4] | 162 (44.63) |

Furthermore, as shown in FIG. 7 and Table 3, Sample 1 indicating a comparative example produced with only the ball mill had a small rate of a peak intensity P3, compared with Samples 5 and 6, and the Rate (3R) was 23%. In addition, the intensity ratio P1/P2 was 0.008.

TABLE 3

|  | Peak intensities [counts · deg] (2θ[°]) |
|---|---|
| Hexagonal crystals 2H (100) [P1] | 120 (42.4) |
| Hexagonal crystals 2H (002) [P2] | 15,000 (26.5) |
| Rhombohedral crystals 3R (101) [P3] | 50 (43.3) |
| Hexagonal crystals 2H (101) [P4] | 160 (44.5) |

Figure 2:
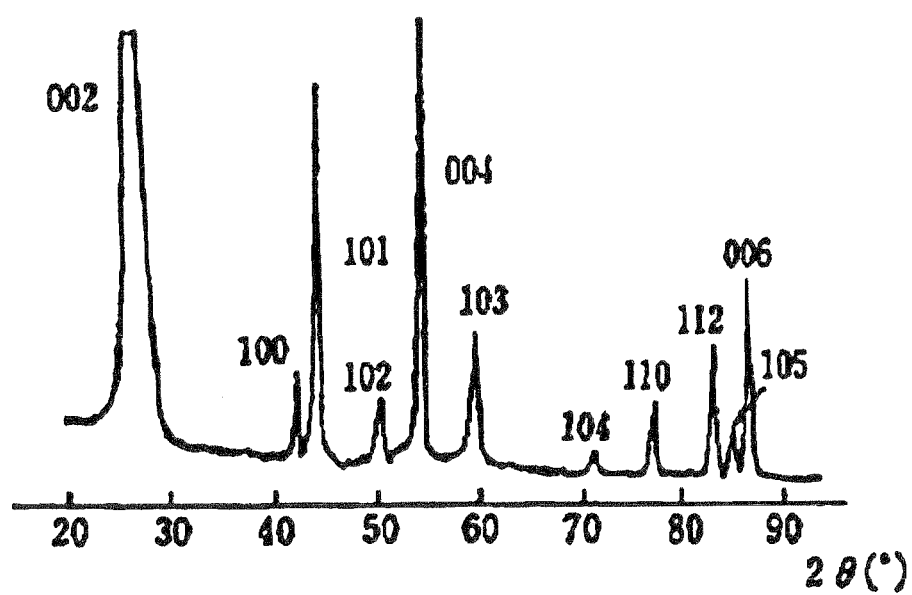
FIG. 2 is a diagram which shows an X-ray diffraction profile of general natural graphite.

Thus, Sample 5 produced by the production apparatus B of Example 1, and Sample 6 produced by the production apparatus A of Example 1 had Rates (3R) of 46% and 51%, respectively, and it was shown that their Rates (3R) were 40% or more, or 50% or more, compared with the natural graphite shown in FIG. 2 and Sample 1 indicating a comparative example.

Next, graphene dispersions were produced using the above-produced graphene precursors, and their easiness in exfoliation of graphene was evaluated.

<As to Graphene Dispersions>

Figure 8:
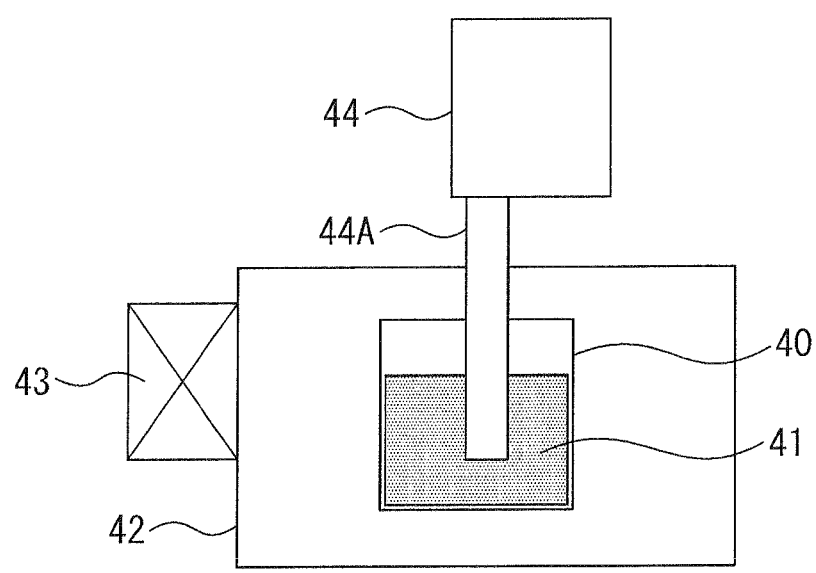
FIG. 8 is a diagram which shows a dispersion-producing apparatus which produces a dispersion using a graphite-based carbon material as a precursor.

A method for producing a graphene dispersion will be explained with reference to FIG. 8. FIG. 8 shows, as an example, a case where an ultrasonic treatment and a microwave treatment are combined in a liquid when a graphene dispersion is produced.

(1) 0.2 g of a graphite-based carbon material useful as a graphene precursor and 200 ml of N-methylpyrrolidone (NMP) which serves as dispersing medium are charged to a beaker 40.

(2) The beaker 40 is put into a chamber 42 of a microwave generator 43, and an ultrasonic trembler 44A of an ultrasonic horn 44 is inserted into dispersing medium 41 from the upper direction.

(3) The ultrasonic horn 44 is activated, and ultrasonic waves of 20 kHz (100 W) are continuously applied thereto for 3 hours.

(4) While the above ultrasonic horn 44 is actuated, the microwave generator 43 is activated to apply microwaves of 2.45 GHz (300 W) intermittently (irradiation for 10 seconds every 5 minutes) thereto.

Figure 9:
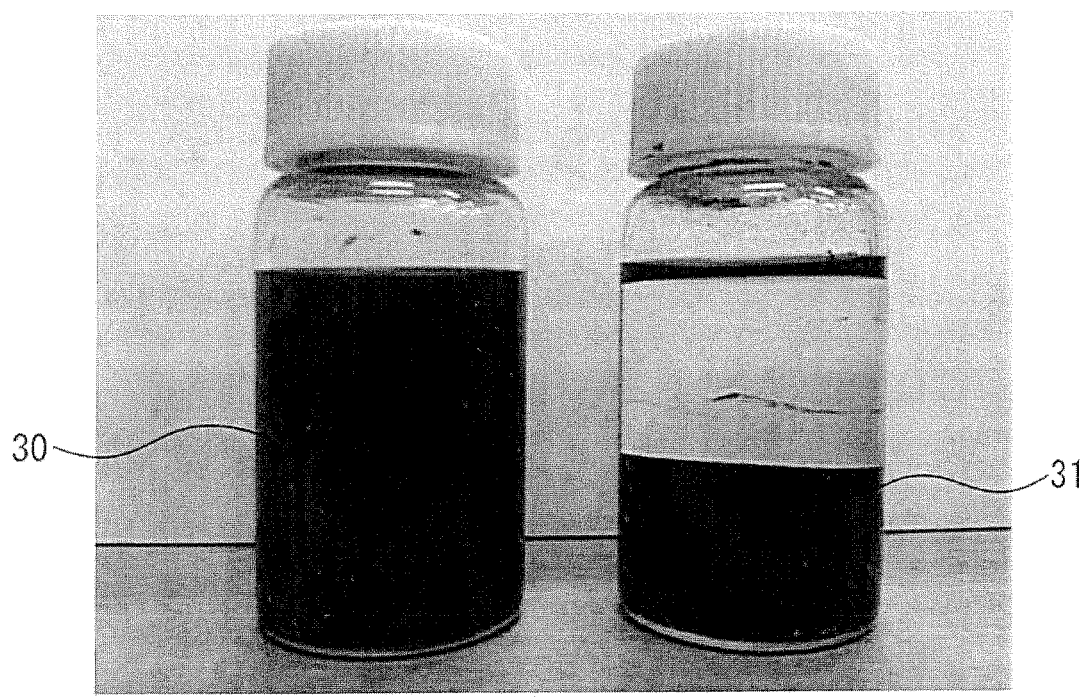
FIG. 9 is a diagram which shows dispersing states of dispersions produced by using graphite-based carbon materials of Sample 1 indicating a comparative example, and Sample 5 produced by the production apparatus B of Example 1.

FIG. 9 refers to appearances of graphene dispersions produced in the above-described way when 24 hours had passed.

Although a portion of the graphene dispersion 30 using Sample 5 produced by the production apparatus B was deposited, a product entirely showing a black color was observed. For this, it is considered that a large portion of the graphite-based carbon materials used as graphene precursors are dispersed in a state where graphene is exfoliated from them.

In the dispersion 31 using Sample 1 indicating a comparative example, most of the graphite-based carbon materials were deposited, and it was confirmed that a portion thereof floated as a supernatant. From the facts, it is considered that graphene was exfoliated from a small portion thereof and that they floated as the supernatant.

Furthermore, the graphene dispersion produced in the above-described way was diluted to an observable concentration, was coated onto a sample stage (TEM grid), and the grid was dried. Thus, the size and the number of layers of graphene was observed in the captured image of a transmission electron microscope (TEM), as shown in FIG. 10. In addition, the grid coated with the diluted supernatant was used for Sample 1. For example, in the case of FIG. 10, the size corresponds to a maximum length L of a flake 33, which was 600 nm, based on FIG. 10(*a*). As for the number of layers, the end face of the flake 33 was observed in FIG. 10(*b*), and overlapping graphene layers were counted, thereby calculating the number of layers as 6 layers (a portion indicated by the symbol 34). In this way, the size and the number of layers were measured with respect to each flake ("N" indicates the number of flakes), and the numbers of graphene layers and the sizes shown in FIGS. 11 and 12 were obtained.

Figure 11A:
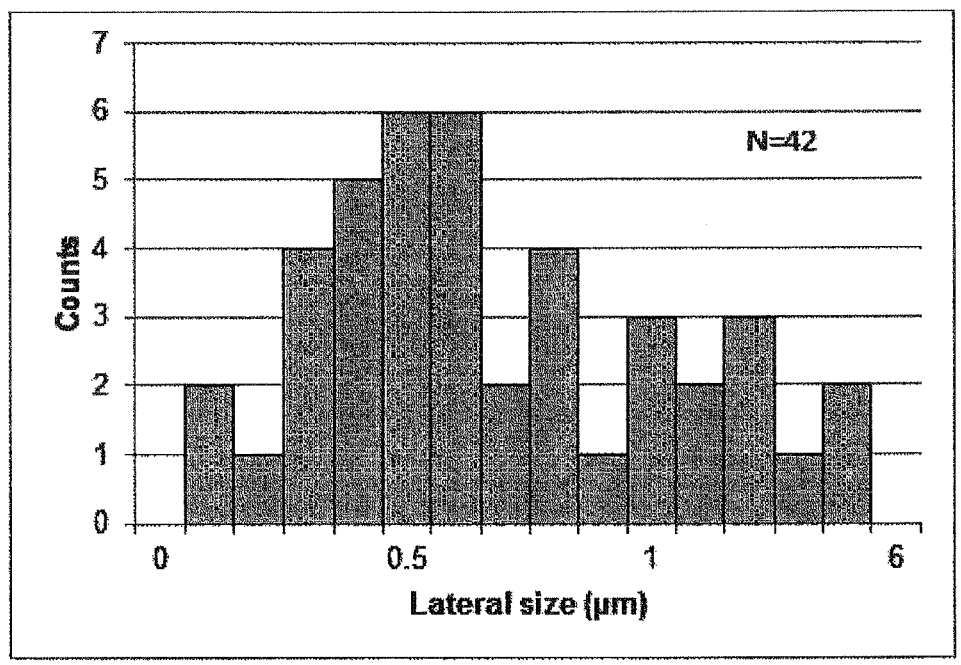
FIG. 11 is a figure which shows distribution states of a graphite-based carbon material dispersed in a dispersion which was produced using a graphite-based carbon material (precursor) of Sample 5, where (a) is a diagram which shows an average size distribution, while (b) is a diagram which shows a distribution of the number of layers.
Figure 11B:
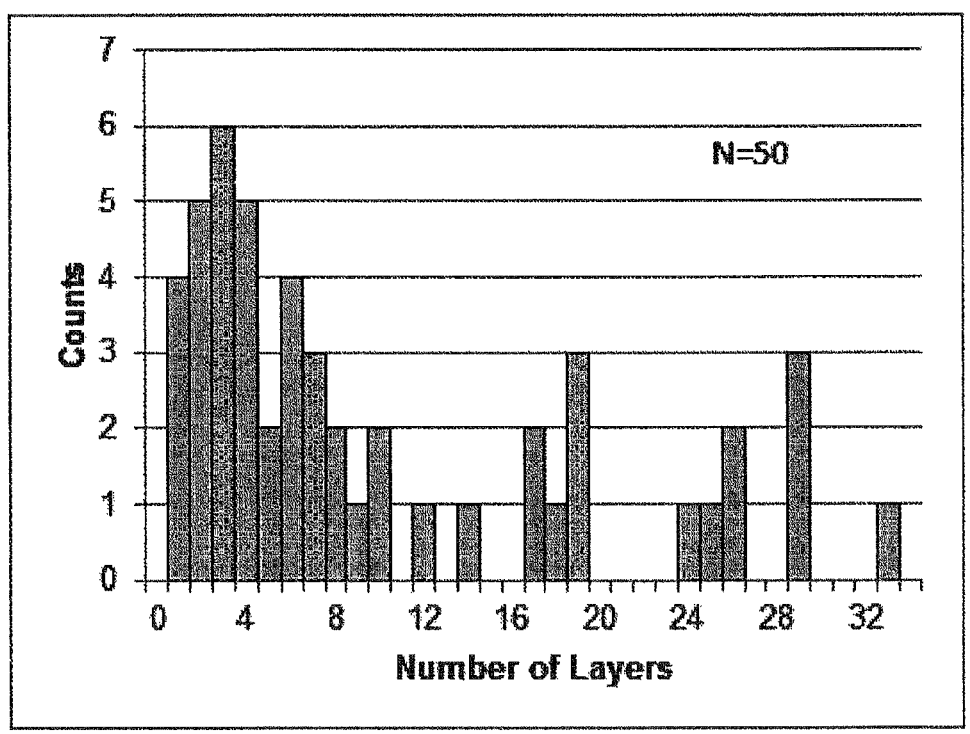

With reference to FIG. 11(*a*), a particle size distribution (distribution of sizes) of thin flakes included in the graphene dispersion of Sample 5 (Rate (R3) of 46%) produced by the production apparatus B of Example 1 was a distribution having a peak of 0.5 μm. In addition, in FIG. 11(*b*), as to the number of layers, a distribution which had a peak in 3 layers and in which graphene having 10 layers or less were 68% was observed.

Figure 12A:
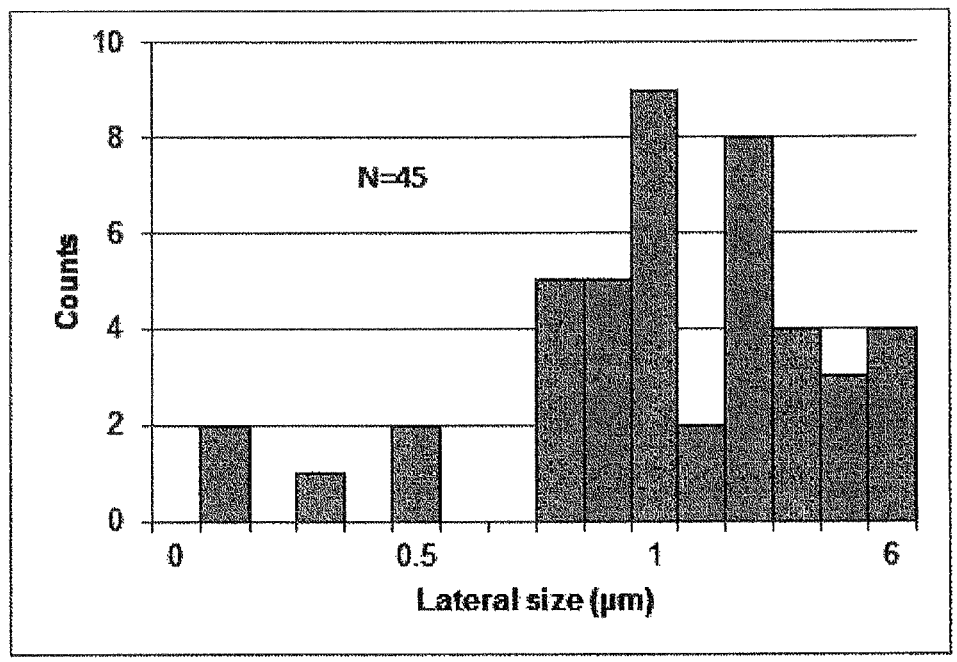
FIG. 12 is a figure which shows a distribution state of a graphite-based carbon material dispersed in a dispersion which was produced using a graphite-based carbon material of Sample 1 indicating the comparative example, where (a) is a diagram showing an average size distribution, and (b) is a diagram showing a distribution of the number of layers.
Figure 12B:
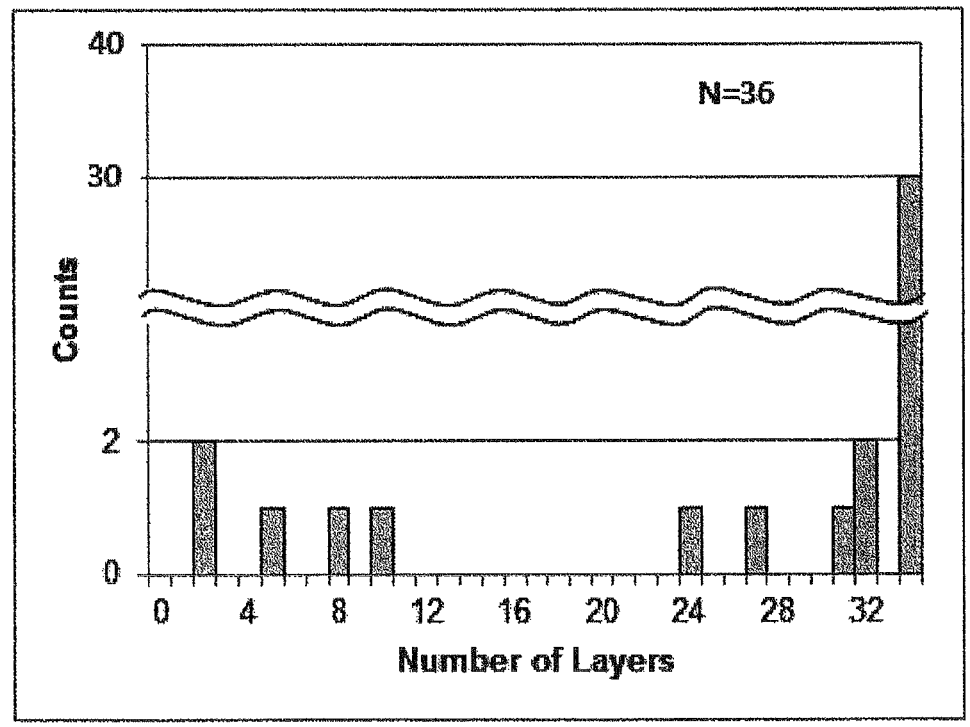

With reference to FIG. 12, a particle size distribution (distribution of sizes) of thin flakes included in the dispersion of Sample 1 (Rate (R3) of 23%) of the comparative example was a distribution having a peak of 0.9 μm. In addition, as for the number of layers, a distribution in which those having 30 layers or more occupied the greater portion and in which graphene having 10 layers or less were 10% was observed.

From the results, it was revealed that, when the product of Sample 5 produced by the production apparatus B was used as a graphene precursor, a highly-concentrated graphene dispersion which contains plenty of graphene of 10 layers or less and which has excellent dispersibility of graphene can be obtained.

Next, with reference to FIG. 13, a relation between the Rate (3R) of the graphene precursor and the number of layers in the graphene dispersion will be described. Samples 1, 5 and 6 in FIG. 13 are those described above. Samples 2, 3 and 4 were produced by the production apparatus B which carried out a treatment based on a ball mill and a microwave treatment, and were graphene dispersions produced using graphene precursors which had been produced by making the irradiating time of microwaves shorter than that for Sample 5. In addition, Sample 7 was produced by the production apparatus A which carried out a treatment based on a jet mill and a plasma treatment, and was a graphene dispersion produced by using a graphene precursor which had been produced by applying plasma of a higher output than that for Sample 6.

From FIG. 13, as to Samples 2 and 3 showing Rates (3R) of 31% and 38%, respectively, the distributions of the number of layers have peaks at around 13 as the number of layers; that is, the shapes of the distributions are close to that of a normal distribution (dispersions using Samples 2 and 3). As to Samples 4 to 7 showing Rates (3R) of 40% or more, the distributions of the number of layers have peaks at several as the number of layers (thin graphene); that is, the shapes of the distributions are those of a so-called log normal distribution. On the other hand, as to Sample 1 having a Rate (3R) of 23%, the di distribution thereof has a peak at 30 or more as the number of layers (a dispersion using Sample 1). That is, it is understood as follows: there is a tendency that, in cases where the Rate (3R) reaches 31% or more, the shapes of the layer number distributions differ from those for cases where the Rate (3R) is less than 31%; and further, in cases where the Rate (3R) reaches 40% or more, the shapes of the layer number distributions clearly differ from those for cases where the Rate (3R) is less than 40%. In addition, it can be understood that, as to proportions of graphene of 10 layers or less, the Rate (3R) of the dispersion using Sample 3 is 38%, while the Rate (3R) of the dispersion using Sample 4 is 62%, and that, when the Rate (3R) reaches 40% or more, a proportion of graphene of 10 layers or less rapidly increases.

From these facts, it can be considered that graphene of 10 layers or less are easily exfoliated in cases where the Rate (3R) is 31% or more, and that, as the Rate (3R) increases to 40%, 50% and 60%, graphene of 10 layers or less are more easily exfoliated. In addition, focusing on the intensity ratio P1/P2, Samples 2 to 7 show values within a comparatively narrow range of 0.012 to 0.016, and any of them are preferable because they exceed 0.01 where it is considered that graphene is easily exfoliated since crystal structures will be deformed.

Figure 14:
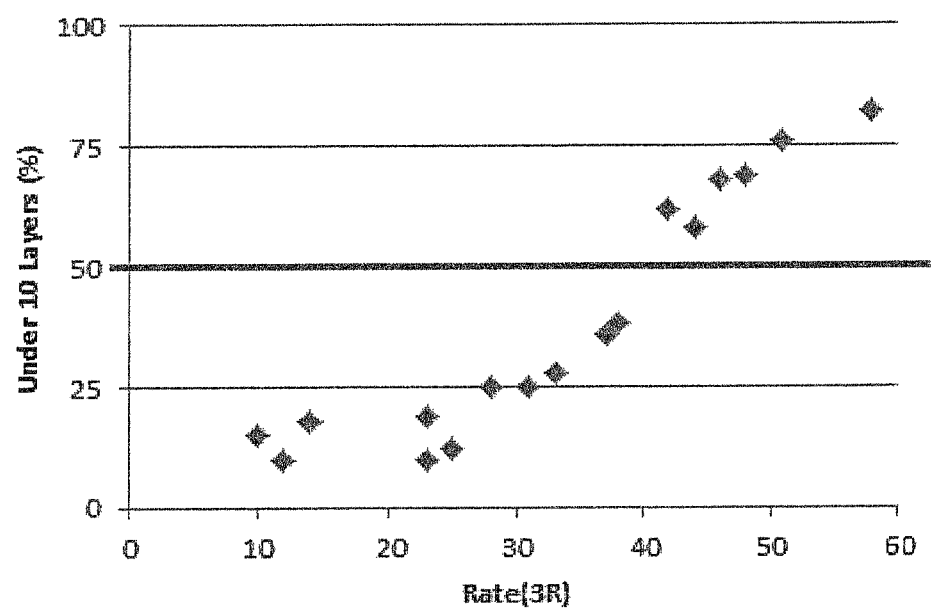
FIG. 14 is a diagram which shows proportions of graphene having 10 layers or less to a content of rhombohedral crystals dispersed in a dispersion.

Furthermore, results obtained by comparing Rates (3R) and proportions of graphene of 10 layers or less included therein are shown in FIG. 14. With reference to FIG. 14, it was revealed that, when the Rate (3R) reached 25% or more, around 31%, graphene of 10 layers or less started to increase (showing an ever-increasing slope). Further, it was revealed that, around 40%, graphene of 10 layers or less rapidly increased (as to proportions of graphene of 10 layers or less, whereas the Rate (3R) of the dispersion using Sample 3 was 38%, the Rate (3R) of the dispersion using Sample 4 was 62%, and the proportion of graphene of 10 layers or less rapidly increased by 24% as the Rate (3R) increased by 4%), and that a percentage of graphene of 10 layers or less against the total graphene was 50% or more. In addition, the points of black squares in FIG. 14 each correspond to different samples, and above-described Samples 1 to 7 and other samples are included therein.

From the facts, when a sample showing a Rate (3R) of 31% or more is used as a graphene precursor to produce a graphene dispersion, the proportion of distributed graphene of 10 layers or less starts increasing; further, when a sample showing a Rate (3R) of 40% or more is used as a graphene precursor to produce a graphene dispersion, 50% or more of graphene of 10 layers or less are produced. In other words, a graphene dispersion in which graphene is highly concentrated and highly dispersed can be obtained. Furthermore, because almost no graphite-based carbon materials (precursors) included in the dispersion deposit as described above, a concentrated graphene dispersion can easily be obtained. According to this method, even a graphene dispersion whose graphene concentration exceeded 10% can be produced without concentrating it. Particularly, the Rate (3R) is preferably 40% or more from a view point that the proportion of dispersed graphene of 10 layers or less sharply increases to 50% or more.

The above description clarifies the following: when the Rate (3R) is 31% or more, preferably 40% or more, and further preferably 50% or more, separation into graphene of 10 layers or less and thin graphite-based carbon materials of around 10 layers occurs in a greater proportion in many cases; and in the case where these graphite-based carbon materials are used as graphene precursors, a highly-concentrated graphene dispersion that has excellent dispersibility of graphene can be obtained. Still further, Example 5 to be described below clarifies that, in the case where the Rate (3R) is 31% or more, graphite-based carbon materials are useful as a graphene precursor.

Furthermore, an upper limit for the Rate (3R) is considered that the upper limit is not particularly defined. However, it is preferable that the upper limit is defined such that the intensity ratio P1/P2 simultaneously satisfies 0.01 or more, because graphene precursors are easily exfoliated when a dispersion or the like is produced. In addition, in cases of production methods using production apparatuses A and B, the upper limit is about 70%, from a viewpoint that graphene is easily produced. Also, a method combining a treatment based on the jet mill of the production apparatus A and a plasma treatment is more preferable, because a graphene precursor having a higher Rate (3R) can easily be obtained. Additionally, the Rate (3R) as long as it reaches 31% or more by combining the physical-force-based treatment and the radiowave-force-based treatment.

Example 2

In Example 1, a case where the ultrasonic treatment and the microwave treatment were combined for obtaining a graphene dispersion is explained. In Example 2, only an ultrasonic treatment was carried out while a microwave treatment was not carried out, and other conditions were the same as those for Example 1.

Figure 15A:
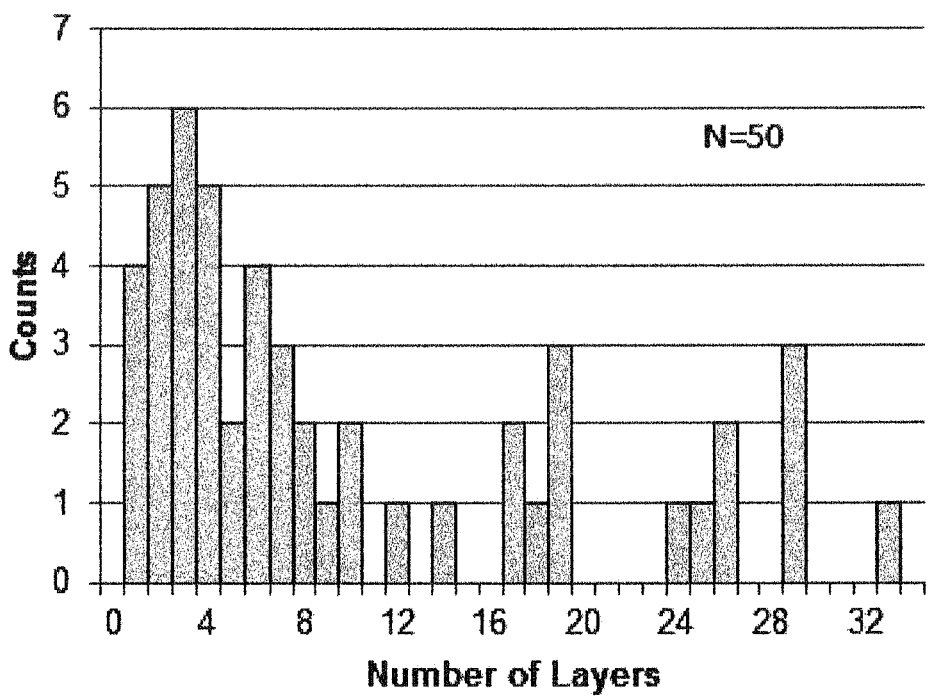
FIG. 15 is a figure which shows a distribution state of graphite when varying conditions for producing a dispersion using a graphite-based carbon material (precursor) of Sample 5 according to Example 2, where (a) is a diagram showing a distribution in a case where an ultrasonic treatment and a microwave treatment were combined, while (b) is a diagram showing a distribution of the number of layers in a case where an ultrasonic treatment was conducted.
Figure 15B:
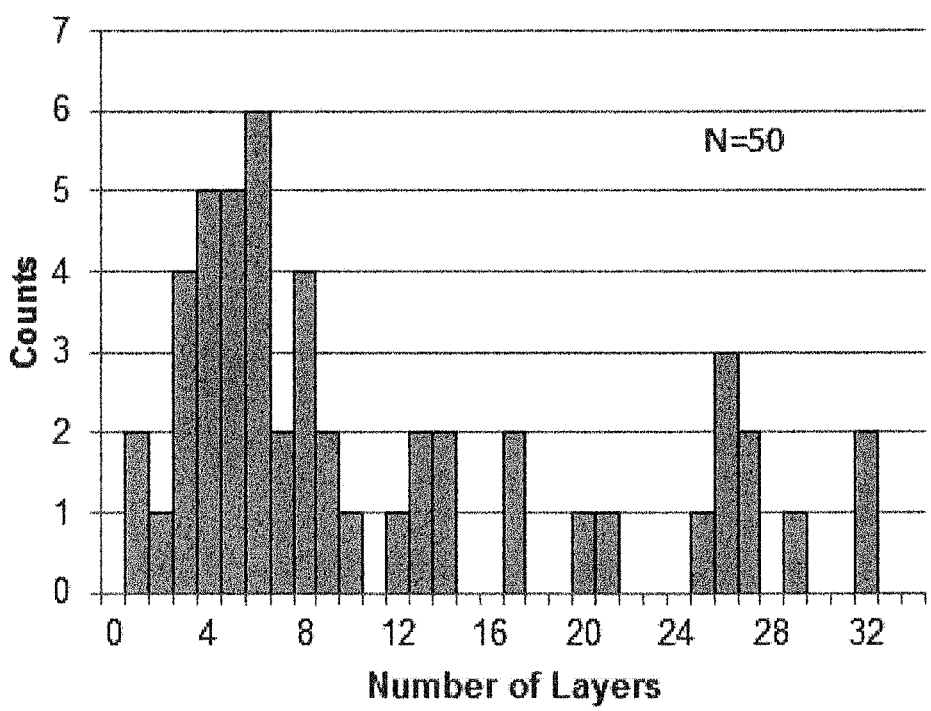
Figure 16:
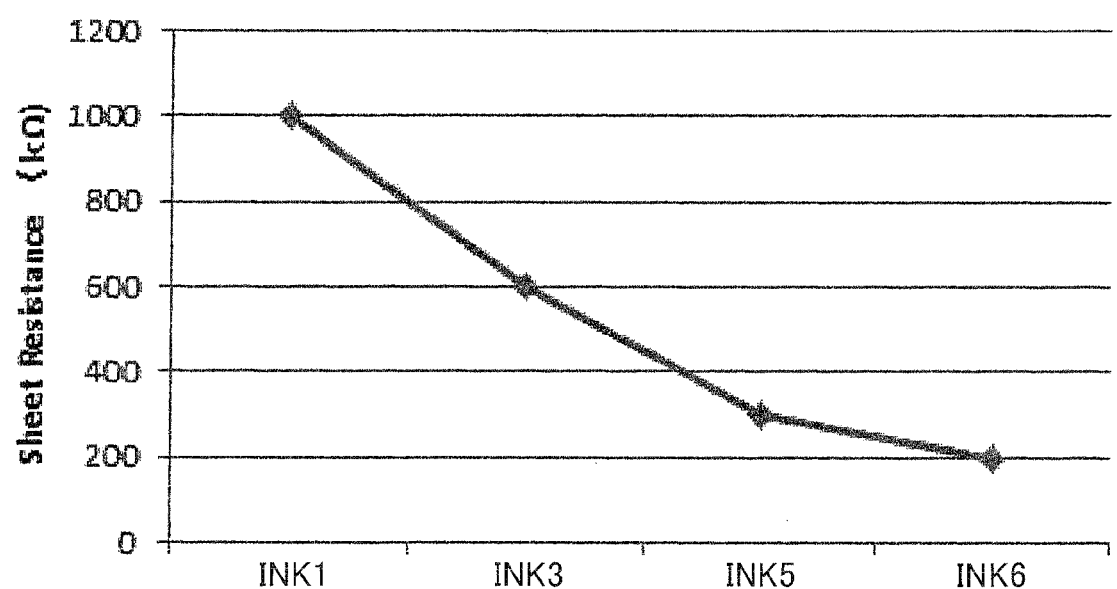
FIG. 16 is a diagram which shows a resistance value when a graphite-based carbon material of Example 3 was dispersed in a conductive ink.

FIG. 15(b) shows a distribution of a number of layers with respect to a graphene dispersion which was obtained by carrying out an ultrasonic treatment using the graphene precursor of Sample 5 (Rate (3R)=46%) produced by the production apparatus B. In addition, FIG. 15(a) is the same as the distribution shown in FIG. 11(b) of Sample 5 produced by the production apparatus B of Example 1.

As a result, although the tendency of the distribution of the number of layers was almost similar, a proportion of graphene of 10 layers or less was 64%, and was slightly decreased, compared with 68% of Example 1. From the fact, it was revealed that it was more effective to simultaneously carry out two of the treatments based on a physical force and a radiowave force for producing a graphene dispersion.

Example 3

In Example 3, an example used for a conductive ink will be described.

Sample 1 (Rate (3R)=23%), Sample 3 (Rate (3R)=38%), Sample 5 (Rate (3R)=46%) and Sample 6 (Rate (3R)=51%) of Example 1 were used as graphene precursors in mixture solution of water and an alcohol of the carbon number of 3 or less, which severed as a conductivity-imparting agent, at concentrations adopted for conductive inks, thus producing INK1, INK3, INK5 and INK6, and their resistance values were compared. Based on the results, as the Rates (3R) became higher, the resistance values were lower.

Example 4

In Example 4, an example in which a graphene precursor was kneaded with a resin will be explained.

When a resin sheet, in which graphene was dispersed, was produced, the tensile strength was very superior although glass fibers were added thereto. Therefore, a factor for this was studied, and, consequently, a finding that a compatibilizer added simultaneously with the glass fibers contributed to formation of graphene from the precursor could be obtained. Therefore, products obtained by mixing dispersing agents and a compatibilizer into a resin were studied.

1 wt % of Sample 5 (Rate (3R)=46%) of Example 1 was added as a precursor directly to LLDPE (polyethylene), and the mixture was kneaded while applying shear (a shearing force) thereto with a kneader, two-shaft kneader (extruder) or the like.

It has been publicly known that, when a graphite-based carbon materials turned into graphene, being highly dispersed in a resin, the tensile strength increases. Therefore, by measuring a tensile strength of the resin, degrees of exfoliating into graphene and dispersion can relatively be estimated. The tensile strength was measured with an exact tabletop general-purpose testing machine (AUTOGRAPH AGS-J) manufactured by Shimadzu Corporation under a condition of test speed of 500 mm/min.

In addition, in order to compare degree of exfoliating into graphene and dispersibility depending on the presence or absence of additives, the following comparisons of three types of (a), (b) and (c) were carried out.

(a) No additives
(b) a general dispersing agent (zinc stearate)
(c) a compatibilizer (a graft-modified polymer)

Figure 17:
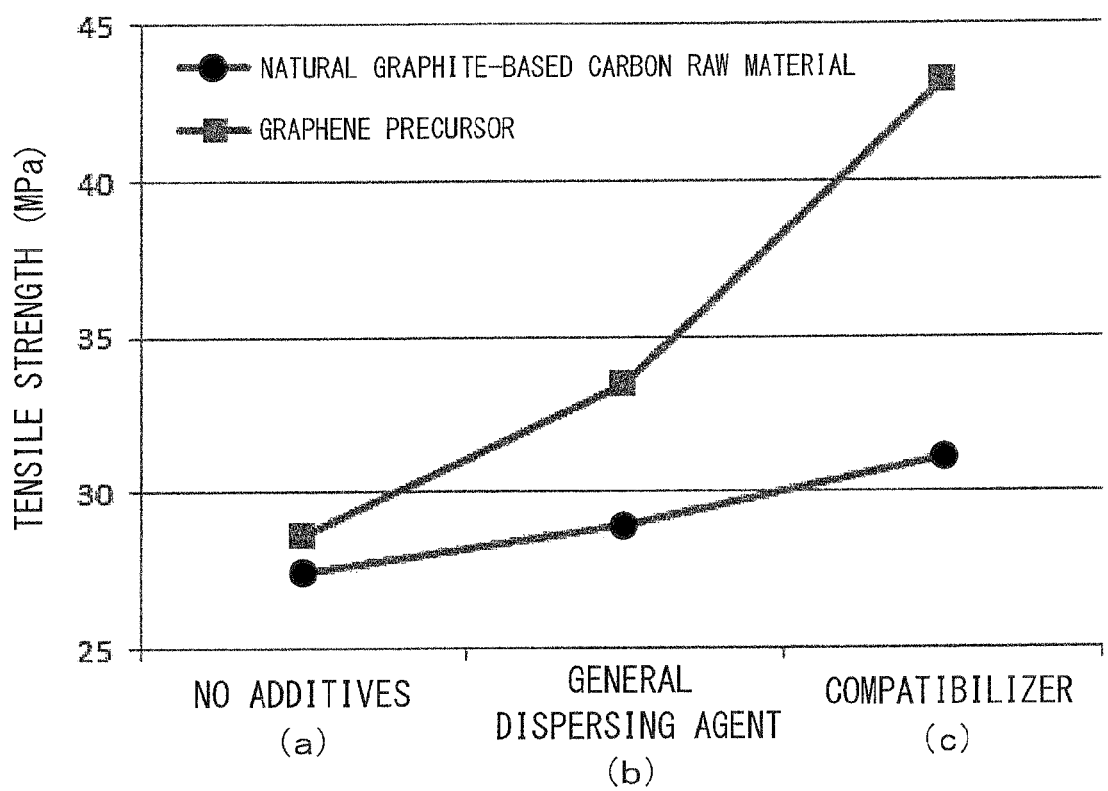
FIG. 17 is a diagram which shows a tensile strength when a graphite-based carbon material of Example 4 was kneaded with a resin.

With reference to FIG. 17 showing the measurement results, the results will be explained. In addition, in FIG. 17, circles refer to resin materials using Sample 1 of the comparative example, and squares refer to resin materials using Sample 5 of Example 1.

In case (a) where no additive was added, a difference of the tensile strengths was small.

In case (b) where the dispersing agent was added, it was revealed that formation of graphene was promoted to a certain degree in the graphene precursor of Sample 5.

In case (c) where the compatibilizer was added, it was revealed that that formation of graphene was significantly promoted in the graphene precursor of Sample 5. This is because it is considered that, besides effects to disperse graphene, the compatibilizer binds the graphene layer-bound bodies and the resin, and acts on them such that the graphene layer-bound bodies are stripped therefrom, when applying shear in that state.

Zinc stearate is explained above as an example of the dispersing agent. However, those suited for compounds may be selected. As examples of the dispersing agent, anionic (anion) surfactants, cationic (cation) surfactants, zwitterionic surfactants, and nonionic surfactants can be mentioned. In particular, anion surfactants and nonionic surfactants are preferable for graphene. Nonionic surfactants are more preferable. Since nonionic surfactants are surfactants which do not dissociate into ions and which show hydrophilic properties by hydrogen bonds with water, as observed in oxyethylene groups, hydroxyl groups, carbohydrate chains such as glucoside, and the like, there is a merit that they can be used in nonpolar solvents, although they do not have a strength of hydrophilicity as high as ionic surfactants. Further, this is because, by varying chain lengths of their hydrophilic groups, their properties can freely be changed from lipophilic properties to hydrophilic properties. As anionic surfactants, X acid salts (as for the X acid, for example, cholic acid, and deoxycholic acid), for example, SDC: sodium deoxycholate, and phosphate esters, are preferable. Furthermore, as nonionic surfactants, glycerol fatty acid esters, sorbitan fatty acid esters, fatty alcohol ethoxylates, polyoxyethylene alkyl phenyl ether, alkyl glycosides, and the like are preferable.

Example 5

In order to further verify that those obtained when the Rate (3R) is 31% or more are beneficial as graphene precursors, which is described above in Example 1, an example in which a graphene precursor was kneaded with a resin will be further explained in Example 5. The following explains elastic moduli of resin molded articles in which graphite-based carbon materials containing Samples 1 to 7 in Example 1, having Rates (3R) plotted in FIG. 14, were used as precursors.

(1) Using the above-described graphite-based carbon material as a precursor, 5 wt % of LLDPE (polyethylene: 20201J produced by Prime Polymer Co., Ltd.) and 1 wt % of a dispersant (nonionic surfactant) were mixed in an ion-exchanged water, and the above-described device illustrated in FIG. 8 was actuated under the same conditions, whereby graphene dispersions containing 5 wt % of graphene and graphite-based carbon materials were obtained.

(2) 0.6 kg of the graphene dispersion obtained in (1) was immediately kneaded into a resin of 5.4 kg using a kneader (pressing-type kneader WDS7-30 produced by Moriyama Co., Ltd.), whereby pellets were produced. The kneading conditions are to be described below. It should be noted that the mixing ratio between the resin and the dispersion was selected so that the amount of the graphene and graphite-based carbon materials mixed therein was eventually 0.5 wt %.

(3) The pellets produced in (2) were formed into a test piece according to JIS K7161 1A (length: 165 mm, width: 20 mm, thickness: 4 mm) by an injection molding machine.

(4) The elastic modulus (Mpa) of the test piece produced in (3) was measured under a condition of a test speed of 500 mm/min according to JIS K7161 by a table-top type precision universal tester produced by Shimadzu Corporation (AUTOGRAPH AGS-J).

The kneading conditions were as follows.
Kneading temperature: 135° C.
Rotor rotation speed: 30 rpm
Kneading time: 15 minutes
Pressurization in furnace: applying 0.3 MPa for 10 minutes after start, and depressurizing to atmospheric pressure after the 10 minutes elapsed Here, the dispersion of the above-described graphene dispersion into a resin is considered as follows. As the melting point of a resin is generally 100° C. or higher, water evaporates in atmosphere, but in a pressing-type kneader, the inside of a furnace can be pressurized. In the inside of the furnace, the boiling point of water is raised so that the dispersion is kept in a liquid form, whereby an emulsion of the dispersion and the resin can be obtained. After applying pressure for a predetermined time, the inside is gradually depressurized, which causes the boiling point of water to decrease, thereby allowing water to evaporate. Here, graphene confined in water are left in the resin. This causes graphene and graphite-based carbon materials to be dispersed at a high concentration in the resin.

Further, since the graphene and graphite-based carbon materials tend to precipitate in the graphene dispersion as time elapses, the graphene dispersion is kneaded into the resin preferably immediately after the graphene dispersion is obtained.

It should be noted that the following may be used as the means for obtaining the emulsion of the dispersion and the resin, other than the pressing kneader: a chemical thruster; a vortex mixer; a homomixer; a high-pressure homogenizer; a hydroshear; a flow jet mixer; a wet jet mill; and an ultrasonic generator.

Further, the following may be used as a solvent for the dispersion, other than water: 2-propanol (IPA); acetone; toluene; N-methylpyrrolidone (NMP); and N,N-dimethyl formamide (DMF).

Table 4 illustrates the relationship between the Rates (3R) of around 30% and the elastic moduli of resin molded articles. It should be noted that Sample 00 in Table 4 is a blank Sample in which no precursor was kneaded, Samples 11 and 12 have Rates (3R) between that of Sample 1 and that of Sample 2, and Sample 21 has a Rate (3R) between that of Sample 2 and that of Sample 3.

TABLE 4

| Sample No. | 00 | 1 | 11 | 12 | 2 | 21 | 3 | 4 |
|---|---|---|---|---|---|---|---|---|
| P3/(P3 + P4) | — | 23% | 25% | 28% | 31% | 35% | 38% | 42% |
| Elastic modulus (MPa) (Average in 5 times) | 175 | 197 | 196 | 199 | 231 | 249 | 263 | 272 |
| Difference from blank | — | 12.4% | 12.0% | 13.9% | 31.7% | 42.1% | 50.0% | 55.6% |
| Under-10 layers upon dispersion in NMP (Reference) | — | 10% | 12% | 25% | 25% | 30% | 38% | 62% |

Figure 18:
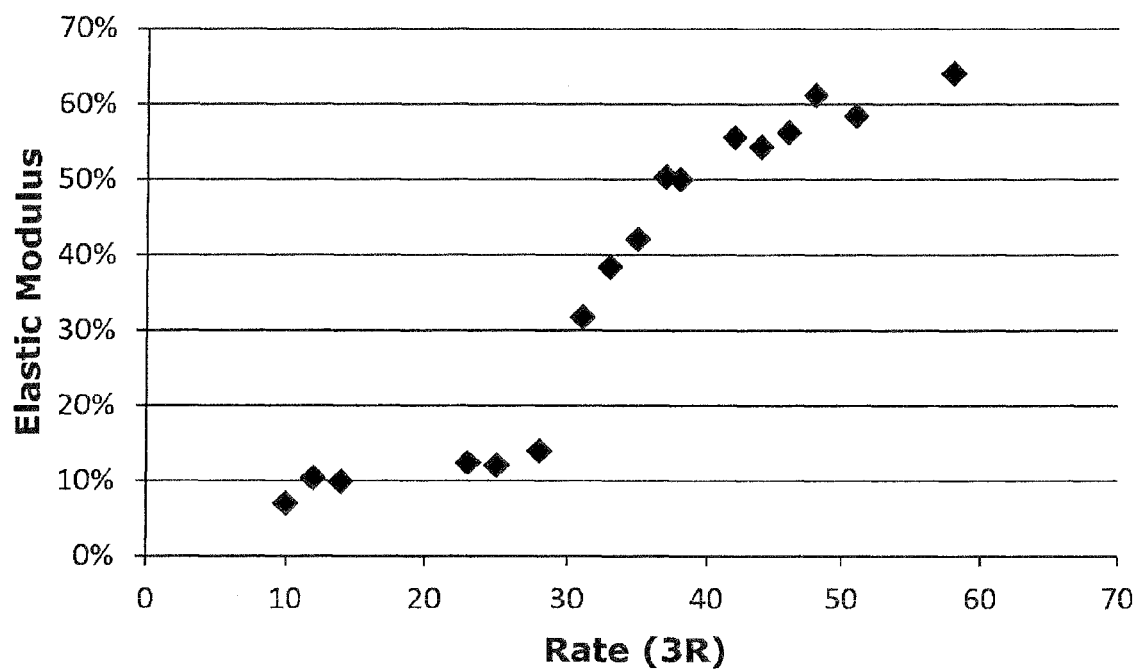
FIG. 18 is a diagram which shows an elastic modulus when a graphite-based carbon material of Example 5 was kneaded with a resin.

FIG. 18 and Table 4 prove that the difference of the elastic modulus with respect to that of Sample 00 (blank) (increase ratio of the elastic modulus) is approximately uniform around 10% until the Rate (3R) reaches 31%; after the Rate (3R) reaches 31%, the difference sharply increases to 32%; while the Rate (3R) increases from 31% to 42%, the difference monotonously increases to 50%; and after the Rate (3R) reaches 42%, the difference slightly increases and converges to around 60%. In this way, when the Rate (3R) is 31% or more, a resin molded article having an excellent elastic modulus can be obtained. Further, since the amount of graphene and graphite-based carbon materials contained in a resin molded article is 0.5 wt %, which is small, influence on properties that the resin originally possesses is small.

Figure 19:
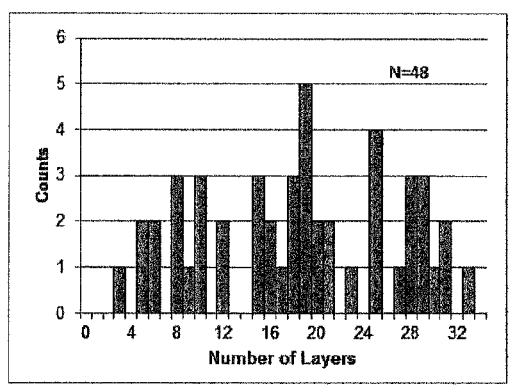
FIG. 19 is a diagram which shows distribution states of graphite-based carbon materials in a dispersion, dispersed in N-methylpyrrolidone (NMP), for providing a supplementary description of a dispersing state of Example 5, where (a) is a distribution state of sample 12, and (b) is a distribution state of sample 2.
Figure 19:
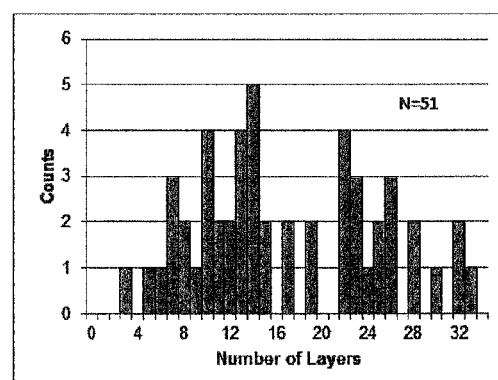

It is considered that this tendency attributes to a sharp increase in a thin graphite-based carbon material containing graphene having 10 or less layers in contact with a resin after the Rate (3R) reaches 31%. Here, in Example 5, it is impossible to determine the number of layers of graphene by observation with TEM due to influences of a dispersant used for dispersion in water. Then, only for reference, the reason for the sharp increase described above is considered based on the distribution of the numbers of layers of the graphite-based carbon material illustrated in Table 4 upon dispersion in NMP. Sample 12 and Sample 2 are compared with each other, and it is found that both of the proportions of graphene (the number of layers are 10 or less) were 25%. On the other hand, as illustrated in FIG. 19, as to Sample 2, the proportion of thin ones having less than 15 layers was greater as compared with Sample 12; in other words, the graphite-based carbon material dispersed as a precursor had a larger surface area, which means that the area thereof in contact with the resin sharply increased.

In this way, Example 5 clearly indicates that when the Rate (3R) is 31% or more, a graphite-based carbon material used as a graphene precursor tends to be separated into graphene having 10 or less layers and a thin graphite-based carbon material.

Example 6

Experiments were performed by adding the graphene precursors produced by the above methods to base oil.

<Various Conditions>
Base oil (mineral oil): Daphne Mechanic Oil 32 (ISO viscosity grade of VG32 manufactured by Idemitsu Kosan. Co., Ltd.) (for industry),
Testing device: Friction abrasion testing device TRB-S-DU-0000 (manufctured by CSM Instruments),
<<Ball-on-Disk Method>>
Ball (diameter: ø6 mm, material: SIM, hardness HV780),
Disk (diameter: ø30, thickness: 2 mm, material: SUS440C, hardness: HV240, surface roughness 0.3 μmRzjis),
<Frictional condition 1: rotational speed: 100 rpm, radius: 10 mm, load: 5 N, oil temperature: 80° C. 30 min>
<Conforming to JIS R 1613 and DIN50324, as well as ASTM and ISO>
Surface roughness measuring device: SV-3000CNC (manufactured by Mitutoyo Corp.)
<Measuring condition: Speed of 0.1 mm/sec, tip radius of 2 μm, measurement force of 0.75 mN, conforming to JIS B0651:2001>
Graphite-based carbon material: graphene precursor (produced by the above methods),
Mixer (ARE-310 manufactured by THINKY),
<Mixing condition 1: Normal temperature of 25° C., mixing at 2,000 rpm×10 min, defoaming after mixing at 2,100 rpm×30 sec)
Comparative material: molybdenum disulfide powder (M-5 manufactured by Daizo Corp. Average diameter of 0.45 μm)
<Experimental Procedures>
Step 1. To base oil (990 g), 10 g of graphene precursors (see Samples 1, 2, 21, and 4 (Samples used in Examples 1 and 5)) are added, and, under the mixing condition 1, the graphene precursors are exfoliated and dispersed to obtain a dispersion 62 having a concentration of 1 wt %.
Step 2. 600 g of the dispersion 62 was put into a liquid holder 61 of a testing device 60 and a friction test was performed by rotating a disk 64 while being contacted with a ball 63 under the frictional condition 1.
Step 3. In a 30 min-long test, average values of a friction coefficient (μ) for the last 30 sec before the end of the test were read and plotted in FIG. 21.
Step 4. By using a surface roughness measuring device, five worn parts on a surface of the disk 64 caused by a contact with the ball 63 were measured, and an abrasion depth was obtained from average values of this measurement and plotted in FIG. 22.

In order to confirm an effect of graphene-like graphite, experiments were performed with a Rate (3R) of 23% (Sample 1), 31% (Sample 2), 35% (Sample 21), and 42% (Sample 4) with a mixture ratio shown in Table 5.

TABLE 5

| | Mixture ratio (wt %) | | | | | | Friction | Abrasion |
| | | | Graphene precursor Rate (3R) | | | | coefficient | depth |
| | Base oil | MoS$_2$ | 23% (Sample 1) | 31% (Sample 2) | 35% (Sample 21) | 42% (Sample 4) | (μ) | (μm) |
|---|---|---|---|---|---|---|---|---|
| Example 6-1 | 99 | — | 1 | — | — | — | 0.095 | 7.2 |
| Example 6-2 | 99 | — | — | 1 | — | — | 0.041 | 3.1 |
| Example 6-3 | 99 | — | — | — | 1 | — | 0.025 | 2.2 |
| Example 6-4 | 99 | — | — | — | — | 1 | 0.022 | 2.0 |
| Comparative example 6-1 | 100 | — | — | — | — | — | 0.125 | 11 |
| Comparative example 6-2 | 99 | 1 | — | — | — | — | 0.093 | 9.2 |

Figure 21:
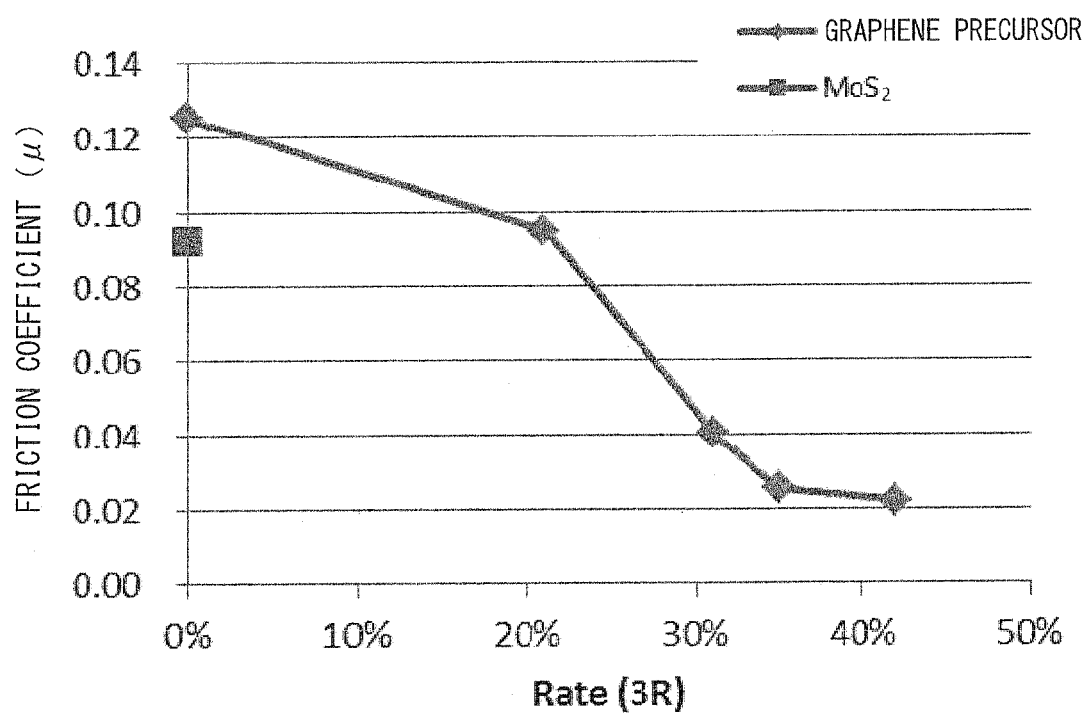
FIG. 21 is a graph which shows a friction coefficient of a test piece of Example 6.
Figure 22:
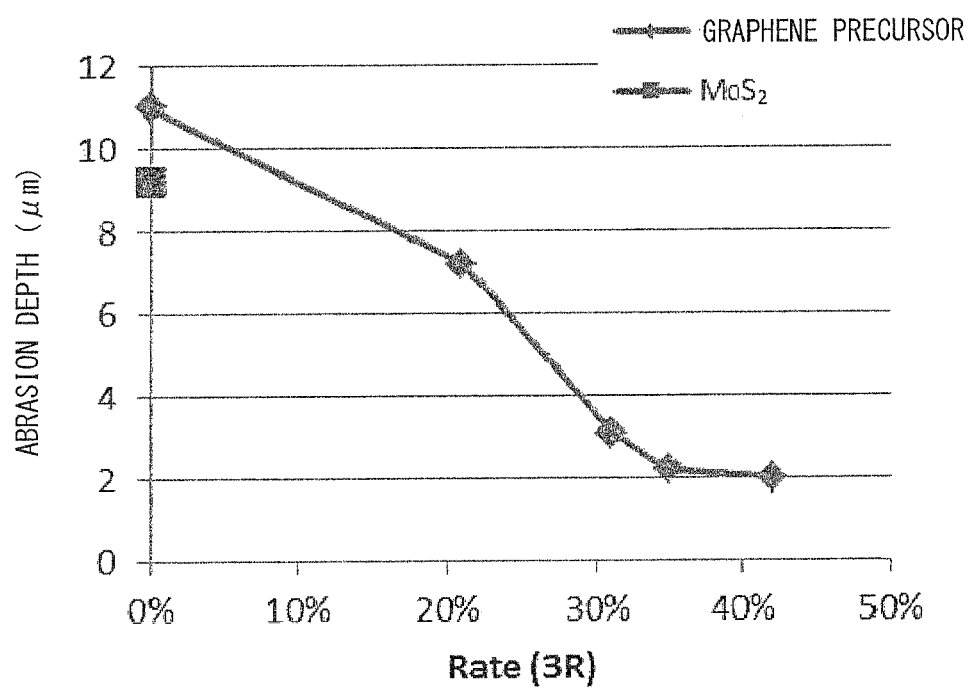
FIG. 22 is a graph which shows an abrasion depth of the test piece of Example 6.

From Table 5 and FIGS. 21 and 22, it was observed that a friction coefficient in Examples 6-2, 6-3, and 6-4 was lower than in Example 6-1 and Comparative examples 6-1 and 6-2, in other words, sliding properties were improved. In particular, when the Rate (3R) of the graphene precursor reached 31% or more, it was observed that a friction coefficient had a remarkable tendency of becoming significantly low, as compared with cases of the Rate (3R) being 0% (Comparative example 6-1) (strictly speaking, this is not the same as Rate (3R)=0%. Since a graphene precursor was not added, the 0% data shouldn't be plotted to the same graph. Nevertheless the data is plotted at the position of 0% for convenience. Hereinafter, 0% has the same meaning, including a case of MoS$_2$ being used.), the Rate (3R) being 23% (Example 6-1), and Comparative example 6-2 where MoS$_2$ was added.

Further, it was observed that an abrasion depth in Examples 6-2, 6-3, and 6-4 was shallower than in Example 6-1 and Comparative examples 6-1 and 6-2, in other words, abrasion was reduced. Moreover, it was observed that an abrasion depth tended to be shallow when a graphene precursor was added regardless of a Rate (3R) of the graphene precursor. An abrasion depth in Comparative example 6-2 where MoS$_2$ was added was deeper than in Example 6-1. This is because, it is speculated that, MoS$_2$ having a Mohs hardness of 1 is softer than graphene-like graphite having hardness comparable to a diamond (Mohs hardness of 10), or has less lubricity than graphene-like graphite.

When the graphene precursors having the Rate (3R) of 31% or more (Examples 6-2, 6-3, and 6-4) are dispersed in the base oil, a friction coefficient is lowered and an abrasion depth becomes shallow. This is because, it is speculated that, more graphene-like graphite was exfoliated from the graphene precursors or the graphene-like graphite by shearing force generated between the ball 63 and the disk 64, and at the same time, a surface of the disk was protected by the graphene-like graphite adsorbed on a sliding part, as a result, a friction coefficient was lowered and an abrasion depth became shallow.

When the Rate (3R) is less than 31% (Example 6-1), it is considered that an amount of graphene-like graphite that is exfoliated by the shearing force is too small so that an effect of adding the graphene precursor is not sufficiently exerted.

In contrast, when the Rate (3R) is 35% or more (Examples 6-3 and 6-4), an excellent effect is obtained by having a lower friction coefficient and a shallower abrasion depth, as compared with cases of the Rate (3R) being equal to or lower than that. It is considered that this is because the number of pieces of graphene-like graphite was increased as compared with the case of the Rate (3R) being 31% (Example 6-2).

Figure 23:
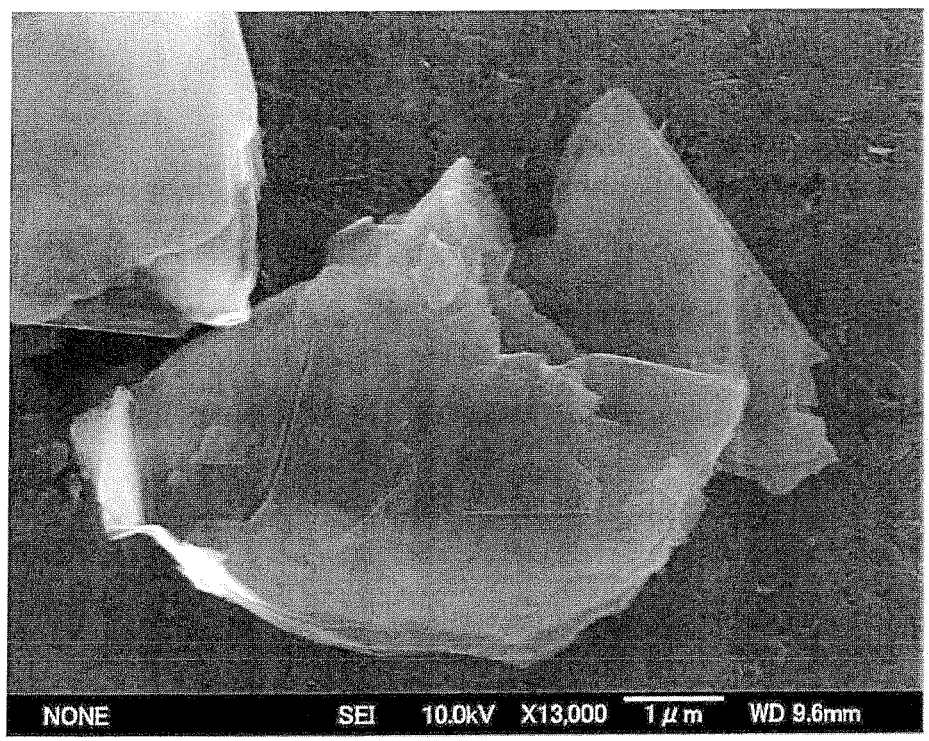
FIG. 23 is a SEM photographed image (plan view) of a graphene precursor.
Figure 24:
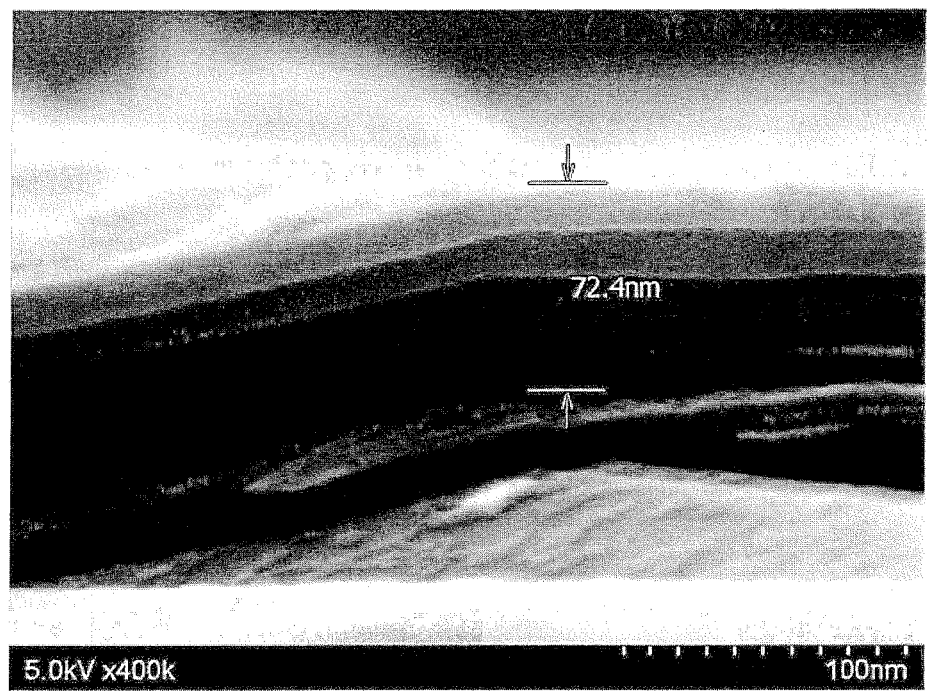
FIG. 24 is a SEM photographed image (side view) of a graphene precursor.

For reference, an explanation is given on photographed images of graphene precursors taken by a scanning electron microscope (SEM). The graphene precursors obtained in Example 1 are a laminate of flaky graphite having a length of 7 μm and a thickness of 0.1 μm as shown for example in FIGS. 23 and 24.

Example 7

Experiments were performed by adding the graphene precursors produced by the above methods to base oil.
<Various Conditions>
Base oil (synthetic oil): Exxon Mobil 1 0W-20 (SAE viscosity grade of 0W-20 manufactured by Exxon Mobil Corp.) (for automobile), Except for base oil experimental conditions and the like are the same as in Example 6.

TABLE 6

| | Mixture ratio (wt %) | | | | | | Friction | Abrasion |
|---|---|---|---|---|---|---|---|---|
| | | | Graphene precursor Rate (3R) | | | | | |
| | Base oil | MoS$_2$ | 23% (Sample 1) | 31% (Sample 2) | 35% (Sample 21) | 42% (Sample 4) | coefficient (μ) | depth (μm) |
| Example 7-1 | 99 | — | 1 | — | — | — | 0.062 | 3.2 |
| Example 7-2 | 99 | — | — | 1 | — | — | 0.023 | 2.5 |
| Example 7-3 | 99 | — | — | — | 1 | — | 0.015 | 2.4 |
| Example 7-4 | 99 | — | — | — | — | 1 | 0.013 | 2.0 |
| Comparative example 7-1 | 100 | — | — | — | — | — | 0.083 | 8.2 |
| Comparative example 7-2 | 99 | 1 | — | — | — | — | 0.065 | 6.2 |

Figure 25:
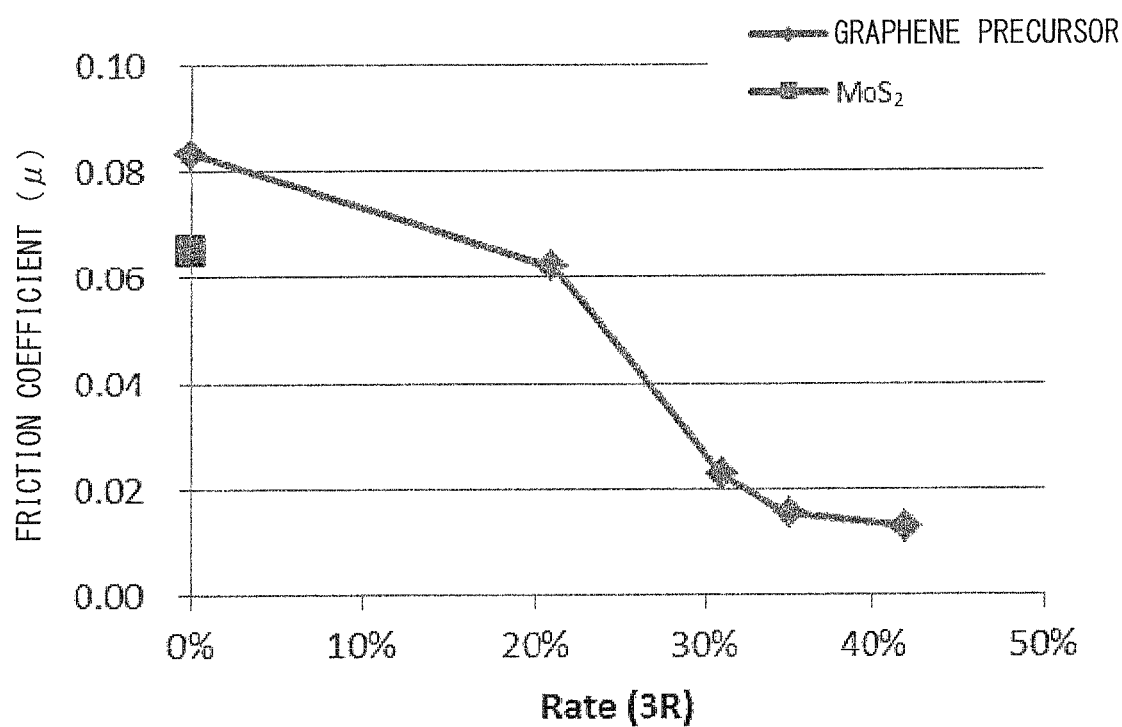
FIG. 25 is a graph which shows a friction coefficient of a test piece of Example 7.
Figure 26:
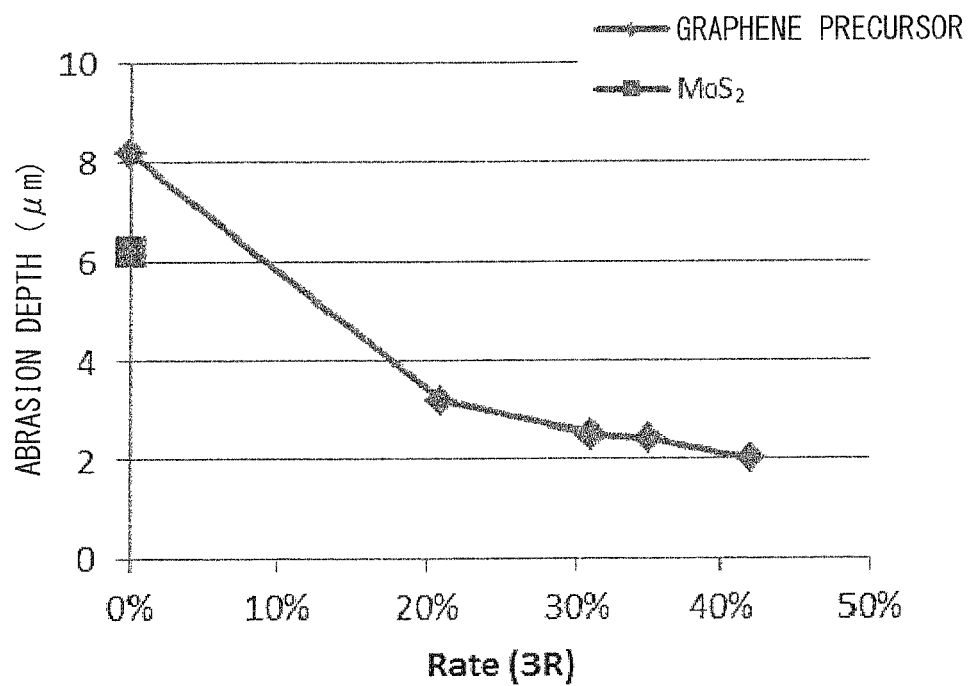
FIG. 26 is a graph which shows an abrasion depth of the test piece of Example 7.

From Table 6 and FIGS. 25 and 26, it was observed that a friction coefficient in Examples 7-2, 7-3, and 7-4 was lower than in Example 7-1 and Comparative examples 7-1 and 7-2. In particular, when the Rate (3R) of the graphene precursors reached 31% or more, it was observed that a friction coefficient had a remarkable tendency of becoming significantly low, as compared with cases of the Rate (3R) being 0% (Comparative example 7-1), the Rate (3R) being 23% (Example 7-1), and Comparative example 7-2 where MoS$_2$ was included.

Further, similarly in the case of a friction coefficient, it was observed that an abrasion depth in Examples 7-2, 7-3, and 7-4 was shallower than in Example 7-1 and Comparative examples 7-1 and 7-2. Moreover, it was observed that an abrasion depth tended to be shallow when a graphene precursor was added regardless of the Rate (3R) of the graphene precursor. An abrasion depth in Comparative example 7-2 where MoS$_2$ was included was deeper than in Example 7-1. This is because, it is speculated that, MoS$_2$ having a Mohs hardness of 1 is softer than graphene-like graphite having hardness comparable to a diamond (Mohs hardness of 10), or has less lubricity than graphene-like graphite.

It is considered that a friction coefficient and an abrasion depth are improved for the same reason as explained in Example 6.

From Examples 6 and 7, it was observed that a friction coefficient was lowered and an abrasion depth became shallow regardless of the kind of base oil. When the graphene precursors having the Rate (3R) of 23% were used (Examples 6-1 and 7-1), it was observed that an abrasion depth became shallow and a friction coefficient was slightly lowered regardless of base oil as compared with the cases where graphene precursors were not added (Comparative examples 6-2 and 7-2), while when the graphene precursors having the Rate (3R) of 31% or more were used, it was observed that a friction coefficient was lowered and an abrasion depth became shallow in a striking manner (both were greatly improved).

Example 8

Figure 20:
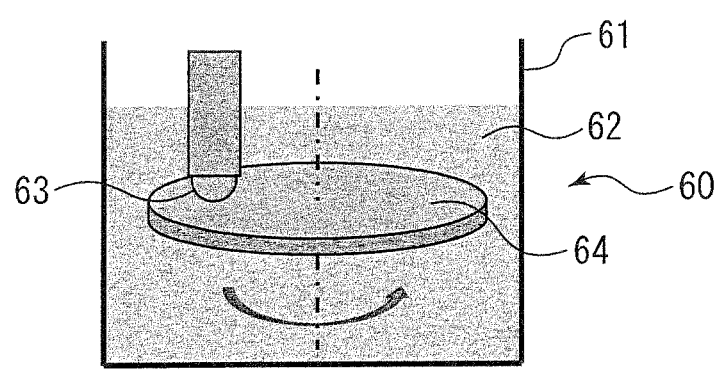
FIG. 20 is a diagram which illustrates a friction abrasion testing device of Example 6.

Experiments were performed by adding the graphene precursors produced by the above methods to base oil.
<Various Conditions>
Base oil (mineral oil): Daphne Eponex Grease No. 1 (NLGI No. 1 manufactured by Idemitsu Kosan Co., Ltd.) (for industry),
<Frictional condition 2: rotational speed: 100 rpm, radius: 10 mm, load: 5 N, oil temperature: 80° C., 10 min>
Except for base oil and frictional conditions, experimental conditions and the like are the same as in Example 6.
Step 1. To 500 g of base oil, 5 g of graphene precursors (see Samples 1, 2, 21, and 4 (Samples used in Examples 1 and 5)) are added, and, under the mixing condition 1, the graphene precursors are exfoliated and dispersed to obtain grease 62 having a concentration of 1 wt %. (For convenience of explanation, a reference sign 62 in FIG. 20 refers to grease in Example 8.)
Step 2. 100 g of the grease 62 was put into a liquid holder 61 of a testing device 60 and a friction test was performed by rotating a disk 64 while being contacted with a ball 63 under the frictional condition 2.
Step 3. In a 30 min-long test, average values of a friction coefficient (μ) for the last 30 sec before the end of the test were read and plotted in FIG. 27.
Step 4. By using a surface roughness measuring device, five worn parts on a surface of the disk 64 caused by a contact with the ball 63 were measured, and an abrasion depth was obtained from average values of this measurement and plotted in FIG. 28.

Further, similarly in the case of a friction coefficient, it was observed that an abrasion depth in Examples 8-2, 8-3, and 8-4 was shallower than in Example 8-1 and Comparative examples 8-1 and 8-2. Moreover, it was observed that an abrasion depth tended to be shallow when a graphene precursor was added regardless of a Rate (3R) of the graphene precursor. An abrasion depth in Comparative example 8-2 where $MoS_2$ was included was deeper than in Example 8-1. This is because, it is speculated that, $MoS_2$ having a Mohs hardness of 1 is softer than graphene-like graphite having hardness comparable to a diamond (Mohs hardness of 10), or has less lubricity than graphene-like graphite.

It is considered that a reason for improvements such as a low friction coefficient and a shallow abrasion depth is the same as explained in Example 6.

From Examples 6, 7, and 8, improvements such as a low friction coefficient and a shallow abrasion depth were observed regardless of the kind of base oil. When the graphene precursors having the Rate (3R) of 23% were used (Examples 6-1, 7-1, and 8-1), it was observed that an abrasion depth became swallow and a friction coefficient was slightly lowered regardless of base oil as compared with the cases where graphene precursors were not added (Comparative examples 6-2, 7-2, and 8-2), while when the graphene precursors having the Rate (3R) of 31% or more were used, it was observed that a friction coefficient was lowered and an abrasion depth became swallow in a striking manner (both were greatly improved).

Example 9

Next, experiments were performed by adding the graphene precursors produced by the above methods to base oil. The experiments were performed with a mixture ratio of the graphene precursors having the Rate (3R) of 31% to base oil under conditions shown in Table 8. Other experimental conditions and the like are the same as in Example 6.

TABLE 7

| | Mixture ratio (wt %) | | | | | Friction | Abrasion |
|---|---|---|---|---|---|---|---|
| | | | Graphene precursor Rate (3R) | | | | |
| | Base oil | $MoS_2$ | 23% (Sample 1) | 31% (Sample 2) | 35% (Sample 21) | 42% (Sample 4) | coefficient (μ) | depth (μm) |
| Example 8-1 | 99 | — | 1 | — | — | — | 0.103 | 4.8 |
| Example 8-2 | 99 | — | — | 1 | — | — | 0.069 | 3.1 |
| Example 8-3 | 99 | — | — | — | 1 | — | 0.044 | 2.4 |
| Example 8-4 | 99 | — | — | — | — | 1 | 0.041 | 2.2 |
| Comparative example 8-1 | 100 | — | — | — | — | — | 0.132 | 7.9 |
| Comparative example 8-2 | 99 | 1 | — | — | — | — | 0.102 | 5.2 |

Figure 27:
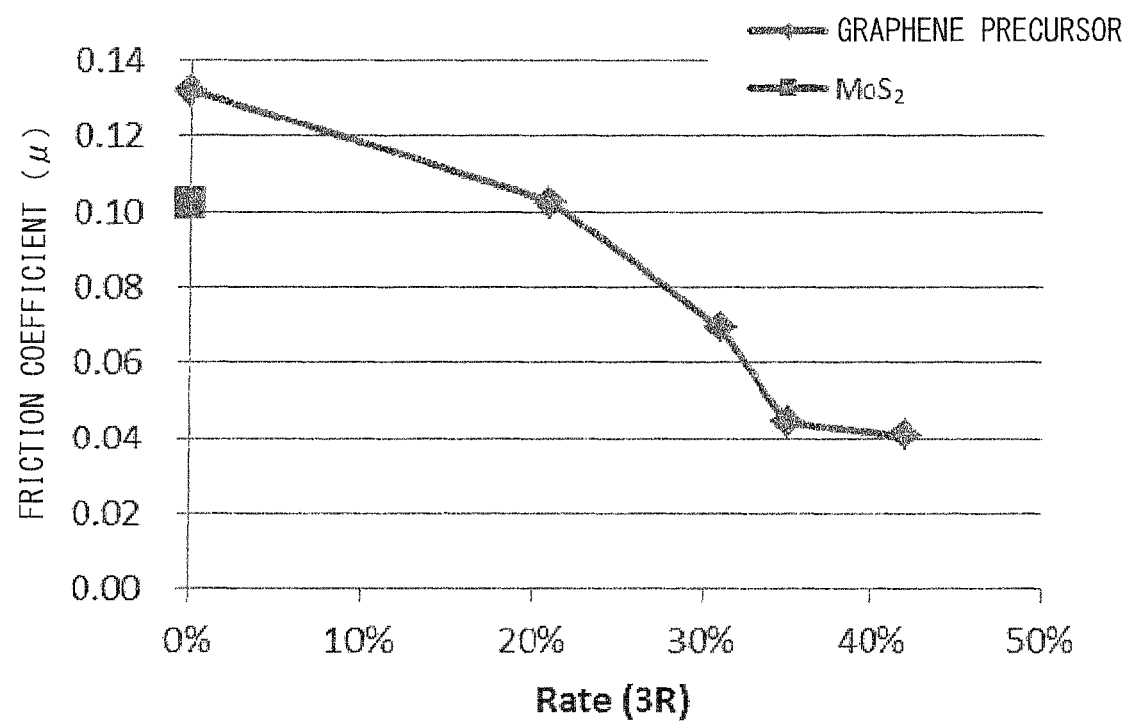
FIG. 27 is a graph which shows a friction coefficient of a test piece of Example 8.
Figure 28:
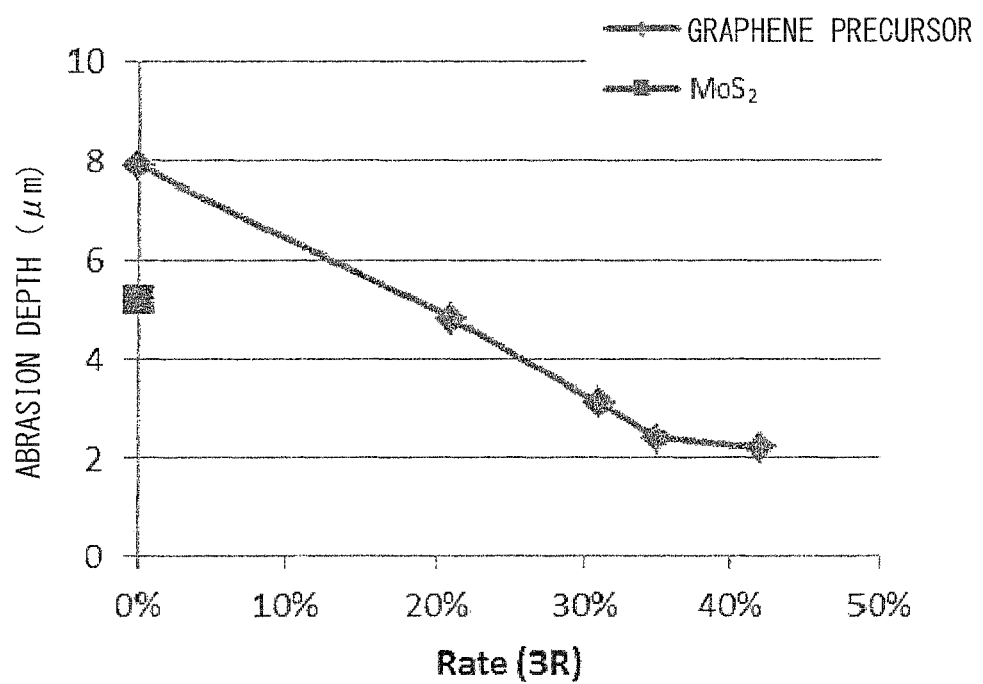
FIG. 28 is a graph which shows an abrasion depth of the test piece of Example 8.

As shown in Table 7 and FIGS. 27 and 28, it was observed that a friction coefficient in Examples 8-2, 8-3, and 8-4 was lower than in Example 8-1 and Comparative examples 8-1 and 8-2. In particular, when the Rate (3R) of the graphene precursors reached 31% or more, it was observed that a friction coefficient had a remarkable tendency of becoming significantly low as compared with cases of the Rate (3R) being 0% (Comparative example 8-1), the Rate (3R) being 23% (Example 8-1), and Comparative example 8-2 where $MoS_2$ was included.

TABLE 8

| | Mixture ratio (wt %) | | Friction coefficient (μ) | Abrasion depth (μm) |
|---|---|---|---|---|
| | Base oil | Graphene precursor Rate (3R) = 31% (Sample 2) | | |
| Example 6-1 | 99 | 1 | 0.0952 | 6.5 |
| Example 9-1 | 98 | 2 | 0.0792 | 5.9 |

TABLE 8-continued

| | Mixture ratio (wt %) | | | |
|---|---|---|---|---|
| | Base oil | Graphene precursor Rate (3R) = 31% (Sample 2) | Friction coefficient (μ) | Abrasion depth (μm) |
| Example 9-2 | 97 | 3 | 0.0652 | 5.2 |
| Example 9-3 | 95 | 5 | 0.0434 | 4.2 |
| Example 9-4 | 93 | 7 | 0.0352 | 3.7 |
| Example 9-5 | 91 | 9 | 0.0321 | 3.6 |
| Example 9-6 | 89 | 11 | 0.0325 | 3.5 |
| Example 9-7 | 87 | 13 | 0.0357 | 3.7 |
| Example 9-8 | 85 | 15 | 0.0389 | 3.5 |
| Example 9-9 | 99.2 | 0.8 | 0.0998 | 7.3 |
| Example 9-10 | 99.5 | 0.5 | 0.1082 | 8.2 |
| Example 9-11 | 99.7 | 0.3 | 0.1127 | 9.5 |
| Example 9-12 | 99.9 | 0.1 | 0.1201 | 10 |
| Comparative example 6-1 | 100 | — | 0.1253 | 11 |

Figure 29:
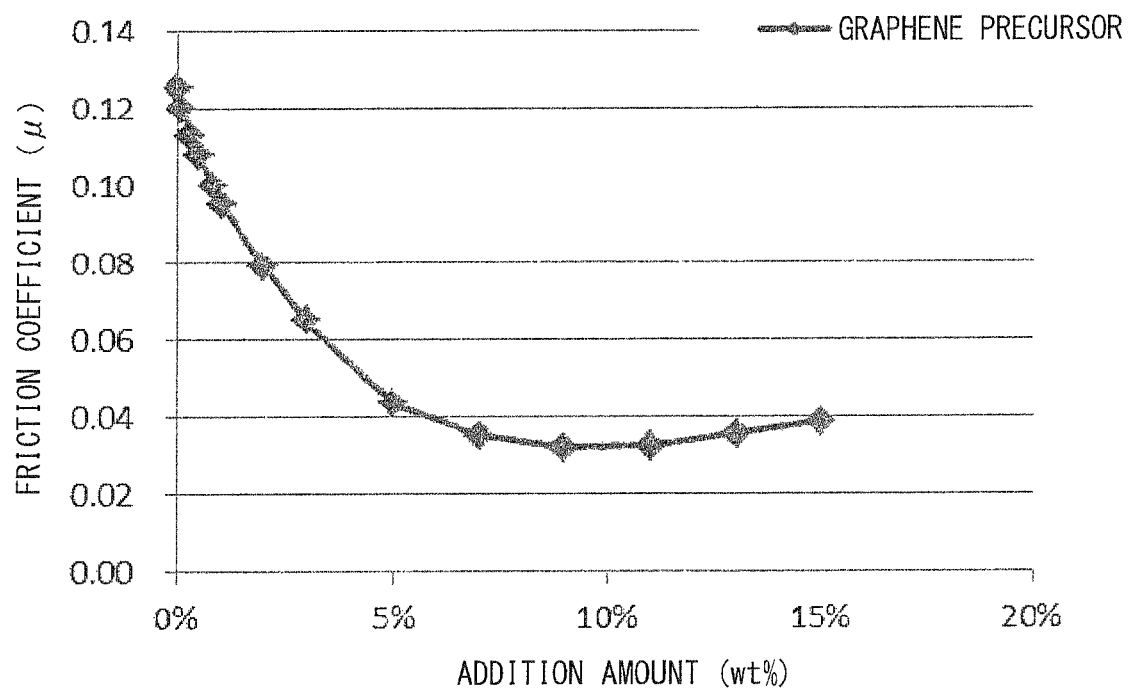
FIG. 29 is a graph which shows a friction coefficient of a test piece of Example 9.
Figure 30:
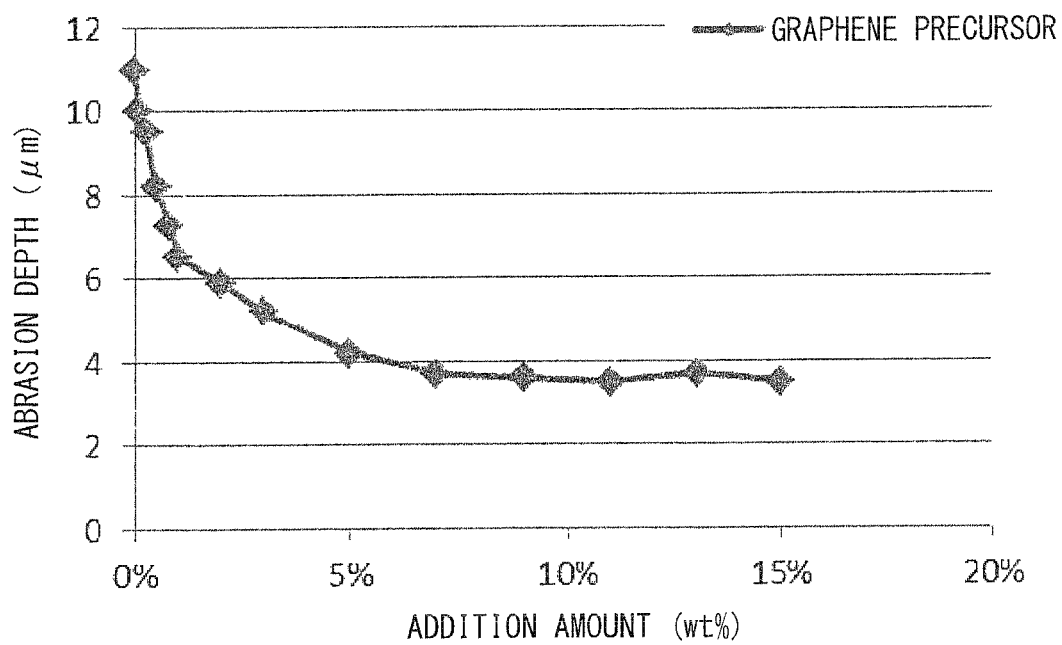
FIG. 30 is a graph which shows an abrasion depth of the test piece of Example 9.

From Table 8 and FIGS. 29 and 30, when the mixture ratio of the graphene precursors to the base oil was in the vicinity of 1/10 (Example 9-5), it was observed that a friction coefficient and an abrasion depth stayed at mostly the same values and their characteristics became saturated. Further, when the mixture ratio of the graphene precursors is 1/10 or more, it was observed that a friction coefficient was conversely increased. On the other hand, when the mixture ratio was 1/200 (Example 9-10), it was observed that a friction coefficient was lowered by 10% or more and an abrasion depth became shallow by 20% or more, as compared with Comparative example 6-1 where a graphene precursor was not added. Moreover, it was observed that a friction coefficient was sharply lowered when the mixture ratio was 1/50 (Example 9-1) or more, while an abrasion depth sharply became shallow when the mixture ratio was 1/200 (Example 9-10) or more.

Based on these, a lower limit of the mixture ratio is 1/10,000 or more, preferably 1/1,000 or more, and further preferably 1/200 or more, and an upper limit thereof is less than 1, preferably less than 1/10, and further preferably less than 1/50.

Further, in Example 6-9, an additive may be added for a purpose of preventing oxidation of base oil. In this case, an additive shall be included in a mixture ratio (wt %) of base oil. Examples of such an additive include ZnDTP (zinc dithiophosphate), phenols, amines, sulfides, and radioactive substances. Particularly preferable are radioactive substances that emit negative ions having a suppressing effect of radical groups (activity) acting as an oxidation factor. Of these, Bad Gastein ores (place of origin: Austria) that contain radium 226 having a long half-life are preferable.

This paragraph describes a mechanism of oxidation. Oxidation factors include oxygen, temperature, worn metal powders, moisture, blow-by gas, and the like, and when these factors are interacted with a hydrocarbon group contained in base oil, the hydrocarbon group (RH) is decomposed into R (activity) and H (hydrogen). Subsequently, the decomposed R is changed to form a peroxide, such as (ROO) and (ROOH), by binding to oxygen ($O_2$). This peroxide reacts with another hydrocarbon group contained in base oil to induce a chain reaction, thereby causing a rapid oxidation reaction.

Moreover, in Example 6-9, the graphene precursors are produced by a radiowave force-based treatment and/or a physical force-based treatment as described above, thus it is not necessary to perform an oxidation/reduction treatment. Further since a reduction treatment is not necessary to produce a mixture with base oil, high temperature or drying to a powder is not required, as a result, kneading with base oil is readily performed.

The foregoing explained the embodiments of the present invention using drawings, however it should be understood that the specific constitutions are not at all restricted to these embodiments, and changes and additions are also included in the present invention without departing from the gist of the present invention.

Examples of a base material for dispersing a graphite-based carbon material include the following. It is noted that a mixture ratio of a base material may be smaller than that of a graphite-based carbon material.

As base oil, mineral oils such as paraffin-based oils and naphthenic oil are included. Further included are synthetic oils based on esters, such as aolefin (PAO), polyol esters, diesters, and complex esters, synthetic hydrocarbons, ethers, phenyl ethers, silicones, and the like. Further included are oils derived from plants, such as castor oil, rapeseed oil, and wax. Oils derived from animals, such as oil of sperm whale and oil of beef tallow, are also included.

As grease included are grease based on calcium soap, grease based on calcium complex, grease based on sodium soap, grease based on aluminum soap, grease based on lithium soap, non-soap based grease, silicone grease, fluoroether grease, and the like.

In addition, as an example of natural graphite for producing a graphite-based carbon material useful as a graphene precursor, particles of 5 mm or less of a natural graphite material (flaky graphite ACE-50 manufactured by Nippon Graphite Industries, ltd.) is described above. However, as for the natural graphite, products which are flaky graphite, being pulverized into 5 mm or less, and which have a Rate (3R) of less than 25% and an intensity ratio P1/P2 of less than 0.01 are preferable, from a viewpoint that they are easily-available. Corresponding to recent technology development, natural graphite-like graphite (in which crystals are stacked in layers) can be artificially synthesized, thus raw materials for graphene and graphene-like graphite are not limited to natural graphite (mineral). Artificial graphite having a high degree of purity is preferably used for a purpose of controlling a metal content. Further as long as a Rate (3R) is 31% or more, artificial graphite, which is not produced by a radiowave force-based treatment or a physical force-based treatment described above, may be used.

It should be noted that a graphite-based carbon material useful as a graphene precursor is generally referred to as graphene, a graphene precursor, a graphene nanoplatelet (GNP), few-layer graphene (FLG), nanographene, and the like, however it is not particularly limited thereto.

INDUSTRIAL APPLICABILITY

The present invention covers a composite lubricating material having lubricity, and an application field thereof is not limited. For example, the following fields are included in the present invention.
 (1) Engine oil
  For internal combustion engines of automobiles, etc.
 (2) Sliding surface oil
  For sliding surfaces of machine tools.
 (3) Turbine oil
  For turbines of thermal power generation, water power generation, nuclear power generation, ships, air planes, etc.

(4) Hydraulic oil
   For hydraulic systems that operate oil pressure of heavy machines, etc.
(5) Bearing oil
   For bearings, rolling bearings, etc.
(6) Lubricant for mist oil supply
   For cooling during annealing, release agents, etc.
(7) Gear Oil
   For bevel gears, worm gears, etc.
(8) Compressor Oil
   For air compressors, etc.
(9) Base oil for refrigerator oil
   For chillers, air conditioners, etc.
(10) Vacuum pump oil
   For oil rotation type vacuum pumps, oil mist pumps, etc.
(11) Transmission oil
   For transmissions such as CVT

The invention claimed is:

1. A composite lubricating material comprising at least a graphene exfoliated from a graphite-based carbon material dispersed in a base oil,
   the graphite-based carbon material having a rhombohedral graphite layer (3R) and a hexagonal graphite layer (2H), wherein a Rate (3R) of the rhombohedral graphite layer (3R) and the hexagonal graphite layer (2H), based on an X-ray diffraction method, which is defined by following Equation 1 is 31% or more:

$$\mathrm{Rate}(3R) = P3/(P3+P4) \times 100 \qquad \text{Equation 1}$$

wherein
   P3 is a peak intensity of a (101) plane of the rhombohedral graphite layer (3R) based on the X-ray diffraction method, and
   P4 is a peak intensity of a (101) plane of the hexagonal graphite layer (2H) based on the X-ray diffraction method,
   the graphene being a crystal of a mean size of 100 nm or more and formed in a flake-like or sheet-like shape having 10 layers or less.

2. The composite lubricating material according to claim 1, wherein a weight ratio of the graphite-based carbon material to the base material is 1/10,000 or more to less than 1.

3. The composite lubricating material according to claim 1, wherein the base oil is derived from mineral, synthetic chemicals, plants or animals.

4. The composite lubricating material according to claim 1, comprising one or more kinds of additives for a purpose of preventing oxidative deterioration.

5. The composite lubricating material according to claim 4, wherein the additive is a radioactive substance.

6. Engine oil comprising the composite lubricating material according to claim 1.

7. Grease comprising the composite lubricating material according to claim 1.

* * * * *